(12) United States Patent
Hussain et al.

(10) Patent No.: US 11,780,458 B1
(45) Date of Patent: Oct. 10, 2023

(54) AUTOMATIC CAR SIDE-VIEW AND REAR-VIEW MIRRORS ADJUSTMENT AND DROWSY DRIVER DETECTION SYSTEM

(71) Applicant: Prince Mohammad Bin Fahd University, Dhahran (SA)

(72) Inventors: Ahmed Abul Hussain, Dhahran (SA); Saifullah Shafiq, Dhahran (SA); Ahmed Abul Hasanaath, Dhahran (SA); Tyma Amin Alnasser, Dhahran (SA); Lujain Shaker Alawami, Dhahran (SA); Lama Khalid Alrimali, Dhahran (SA); Reem Raed Alkhater, Dhahran (SA)

(73) Assignee: Prince Mohammad Bin Fahd University, Dhahran (SA)

( * ) Notice: Subject to any disclaimer, the term of this patent is extended or adjusted under 35 U.S.C. 154(b) by 0 days.

(21) Appl. No.: 18/081,249

(22) Filed: Dec. 14, 2022

(51) Int. Cl.
*B60W 50/14* (2020.01)
*B60R 1/072* (2006.01)
(Continued)

(52) U.S. Cl.
CPC ............ *B60W 50/14* (2013.01); *B60N 2/002* (2013.01); *B60R 1/072* (2013.01); *B60W 40/08* (2013.01);
(Continued)

(58) Field of Classification Search
CPC ............... B60W 50/14; B60W 40/08; B60W 2040/0827; B60W 2040/0881; B60W 2050/143; B60W 2050/146; B60W 2420/22; B60W 2420/42; B60W 2540/221; B60W 2540/223; B60W 2540/225;
(Continued)

(56) References Cited

U.S. PATENT DOCUMENTS 8,235,416 B2    8/2012  Breed et al.
9,460,601 B2 *  10/2016  Mimar ................... G08B 21/06
(Continued)

FOREIGN PATENT DOCUMENTS

CN    105679351 B    8/2018

OTHER PUBLICATIONS

Rho, et al. ; Automatic Mirror Adjustment System using a Driver's Pupils ; Korea University ; Mar. 26, 2003 ; 8 Pages.

*Primary Examiner* — Mohamed Barakat
(74) *Attorney, Agent, or Firm* — Oblon, McClelland, Maier & Neustadt, L.L.P.

(57) ABSTRACT

A smart driver safety system for a vehicle is described. The system includes a drowsy driver detector, an attention diversion monitor, an automatic mirror adjustment subsystem, and a plurality of actuators. The drowsy driver detector determines a head position of the driver and detects an eye position of the driver's eyes. When the driver's eyes are closed, the drowsy driver detector determines a time duration of an eye closure and compares the time duration to a drowsiness threshold. When the eye closure exceeds the drowsiness threshold, the drowsy driver detector generates a drowsiness alert signal. The attention diversion monitor detects an attention diversion based on the eye position and the eye closure and generates an attention diversion alert signal. The automatic mirror adjustment subsystem adjusts a side mirror of the vehicle based on the eye position and the head position.

13 Claims, 11 Drawing Sheets

(51) Int. Cl.
*G06V 20/59* (2022.01)
*G06V 40/16* (2022.01)
*G06V 40/18* (2022.01)
*B60N 2/00* (2006.01)
*B60W 40/08* (2012.01)

(52) U.S. Cl.
CPC .......... *G06V 20/597* (2022.01); *G06V 40/171* (2022.01); *G06V 40/18* (2022.01); *B60W 2040/0827* (2013.01); *B60W 2040/0881* (2013.01); *B60W 2050/143* (2013.01); *B60W 2050/146* (2013.01); *B60W 2420/22* (2013.01); *B60W 2420/42* (2013.01); *B60W 2540/221* (2020.02); *B60W 2540/223* (2020.02); *B60W 2540/225* (2020.02); *B60W 2540/229* (2020.02)

(58) Field of Classification Search
CPC .. B60W 2540/229; B60N 2/002; B60R 1/072; G06V 20/597; G06V 40/171; G06V 40/18
See application file for complete search history.

(56) References Cited

U.S. PATENT DOCUMENTS

| | | | |
|---|---|---|---|
| 9,956,963 B2 | 5/2018 | Vijaya Kumar et al. | |
| 2010/0007480 A1 | 1/2010 | Uozumi et al. | |
| 2010/0033333 A1* | 2/2010 | Victor | A61B 5/7264 340/576 |
| 2011/0169625 A1* | 7/2011 | James | B60W 30/095 340/439 |
| 2012/0093358 A1* | 4/2012 | Tschirhart | B60R 1/00 382/103 |
| 2015/0216466 A1* | 8/2015 | Kronberg | B60K 28/06 702/19 |
| 2017/0242433 A1* | 8/2017 | Ochiai | G01C 21/3484 |
| 2019/0130761 A1 | 5/2019 | Rau et al. | |
| 2019/0370581 A1 | 12/2019 | Cordell et al. | |
| 2023/0119137 A1* | 4/2023 | Vedantam | G06V 40/193 340/576 |

* cited by examiner

FIG. 2A

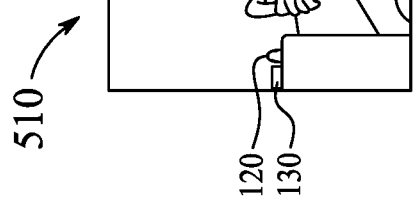
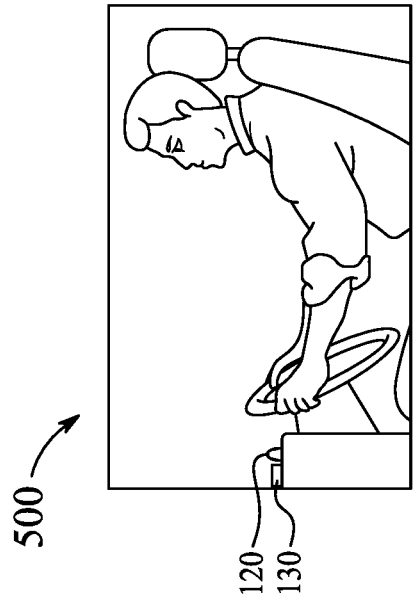
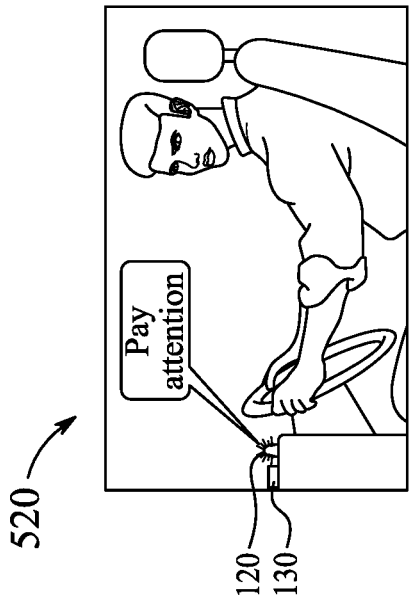

AUTOMATIC CAR SIDE-VIEW AND REAR-VIEW MIRRORS ADJUSTMENT AND DROWSY DRIVER DETECTION SYSTEM

BACKGROUND

Technical Field

The present disclosure is directed to an automatic car side-view and rear-view mirrors adjustment and drowsy driver detection system.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Driving is a responsibility which requires a high level of attention. During driving, it is essential that the driver stay focused and alert at all times to be ready to act accordingly when there are sudden changes on the road. The driver must keep observing the surroundings while monitoring the movements of other vehicles around the vehicle. Driver drowsiness and lack of alertness are major concerns which are responsible for thousands of accidents and fatalities every year. In a report, the Office of Crash Avoidance Research (OCAR) of the National Highway Traffic Safety Administration (NHTSA) identified driver drowsiness as one of the leading causes of single and multiple car accidents. The NHTSA estimates that 100,000 crashes annually involve driver fatigue, resulting in more than 40,000 injuries. Long hours of continuous wakefulness, irregular driving schedules, night shifts, use of mobile phones, and sleep disruption put drivers at higher risk. It was recommended that the driver rest before traveling or stop driving when feeling drowsy to avoid any accidents. It is very important to prevent the driver from feeling drowsy while driving or to keep the driver alert when distracted and unable to concentrate on driving.

Conventional drowsiness detection systems work by measuring physical and physiological features and can provide good detection accuracy. The physical and physiological variables measurements include the measurement of brain waves or electroencephalogram (EEG) and eye activity. However, these systems face various issues, such as attachment of EEG electrodes which are required to be attached to the scalp of the driver, which makes them impractical to use. Under certain conditions, capturing images of the eyes can be difficult, as it is it is difficult to detect eye activity accurately and conveniently. Changes in the light conditions, the angle of the face, shadowing and other environment conditions also affect the performance of an image processing system associated with the conventional drowsiness detection systems.

Another approach for detecting driver drowsiness is based on monitoring vehicle state variables while driving. The vehicle state variables can be monitored for sensing driving operations, including the steering wheel, the accelerator, the brake pedal, the vehicle speed, the acceleration, the yaw rate, and the lateral displacement. However, the methods based on the vehicle state variables are subject to numerous limitations depending on the vehicle type, existing traffic on the road, and conditions of the road.

There are several applications that determine whether a person's eyes are open or closed, as well as the amount of time during which the eyes are open or closed. These applications rely on the detection of light reflected off the eye(s) of the driver. However, these applications have one or more disadvantages, namely that they are typically invasive or distracting to the subject. For example, these applications may distract the subject while in operation, or it may be necessary for the subject to wear special equipment. Also, they are relatively complex in their setup and operation, requiring multiple specialized detectors and/or beam splitters, and requiring precision alignment of each of these parts.

Hence, there is a need for a smart driver safety system that can measure the drowsiness and distractions of the driver in a reliable way and provides interactive communication with the driver to keep him focused, engaged, and mentally active.

SUMMARY

In an exemplary embodiment, a smart driver safety system for a vehicle is described. The smart driver safety system includes a plurality of ultrasonic sensors configured to generate ultrasonic measurements of a head and an upper body of a driver of the vehicle; an infrared camera configured to measure a plurality of features on the driver's face; a drowsy driver detector configured with an electrical circuitry, a memory configured to store program instructions and a microprocessor configured to execute the program instructions, wherein the drowsy driver detector is configured to: determine a head position of the driver, determine when the upper body is in a slouched position, detect an eye position of the driver's eyes, determine whether the eyes of the driver are closed, when the driver's eyes are closed, determine a time duration of an eye closure, compare the time duration to a drowsiness threshold, and when the eye closure exceeds the drowsiness threshold, generate a drowsiness alert signal; an attention diversion monitor connected to the drowsy driver detector, wherein the attention diversion monitor is configured to detect deviations of the eyes of the driver from a straight ahead position and provide an attention diversion alert signal; a plurality of actuators connected to the drowsy driver detector, wherein the plurality of actuators are configured to provide at least one of the drowsiness alert and the attention diversion alert; and an automatic mirror adjustment subsystem connected to the drowsy driver detector, wherein the automatic mirror adjustment subsystem is configured to adjust at least one side mirror of a vehicle.

In another exemplary embodiment, a method for mitigating drowsiness and attention diversion of a driver of a vehicle travelling on a route is described. The method includes performing, by a drowsy driver detector including an electrical circuitry, a memory configured to store the program instructions and a microprocessor configured to execute the program instructions, the steps of: determining, from measurements generated by a plurality of ultrasonic sensors, a head position and an upper body position of the driver; detecting, from images taken by an infrared camera, an eye position of the driver's eyes; determining when the driver is slouching based on the upper body position; determining whether the eyes of the driver are closed; when the driver's eyes are closed, determining a time duration of an eye closure; comparing the time duration to a drowsiness threshold; and when the eye closure exceeds the drowsiness threshold, generating a drowsiness alert signal. The method includes detecting, by an attention diversion monitor connected to the drowsy driver detector, an attention diversion of the driver based on the eye position and the eye closure and generating an attention diversion alert signal. The method providing, by at least one of a plurality of actuators connected to the drowsy driver detector, at least one of the drowsiness alert and the attention diversion alert; and adjusting, by an automatic mirror adjustment subsystem connected to the drowsy driver detector, at least one side mirror of a vehicle.

In another exemplary embodiment, a non-transitory computer readable medium having instructions stored therein that, when executed by one or more processors, cause the one or more processors to perform a method for mitigating drowsiness and attention diversion of a driver of a vehicle travelling on a route is described. The method includes determining, from measurements generated by a plurality of ultrasonic sensors, a head position and an upper body position of the driver and detecting, from images taken by an infrared camera, an eye position of the driver's eyes The method includes determining, when the driver's eyes are closed, a time duration of an eye closure. The method includes comparing the time duration to a drowsiness threshold. The method includes generating, when the eye closure exceeds the drowsiness threshold, a drowsiness alert signal. The method includes detecting, by an attention diversion monitor, attention diversion of the driver based on the eye position and the eye closure and provide an attention diversion alert signal. The method includes providing, by at least one of a plurality of actuators, at least one of the drowsiness alert and the attention diversion alert. The method includes adjusting, by an automatic mirror adjustment subsystem, at least one side mirror of a vehicle.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 2A is an exemplary illustration of visualizing facial landmark coordinates, according to certain embodiments.

FIG. 5A illustrates an exemplary representation of the driver when the driver is attentive, according to certain embodiments.

FIG. 5B illustrates an exemplary representation of the driver when the driver is distracted, according to certain embodiments.

FIG. 5C illustrates an exemplary representation of slumping of the driver based on the analysis performed by an attention diversion monitor, according to certain embodiments.

DETAILED DESCRIPTION

Figure 1A:
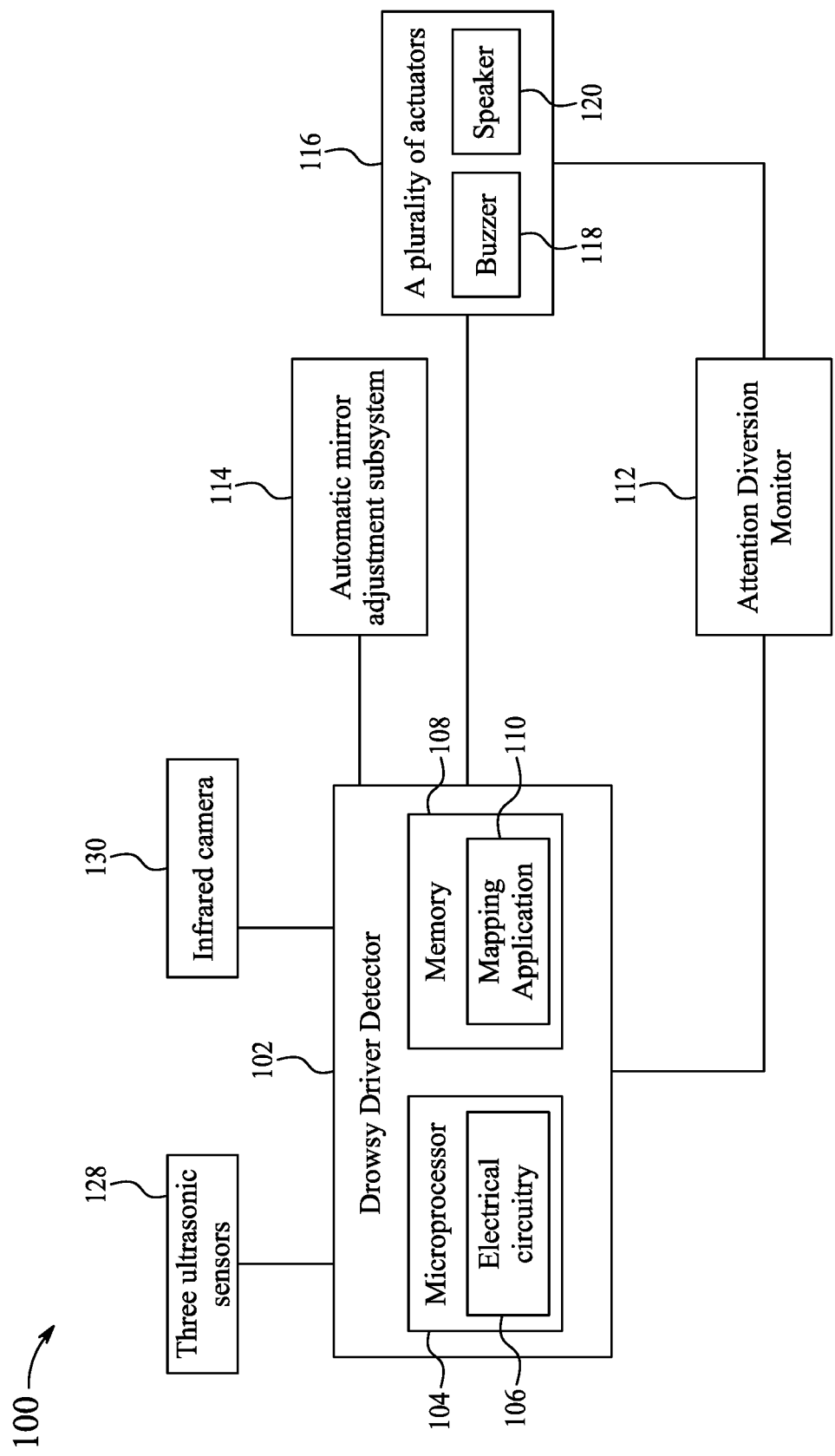
FIG. 1A illustrates a block diagram of a smart driver safety system for a vehicle, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to a smart driver safety system for a vehicle, and a method for mitigating drowsiness and attention diversion of the driver of the vehicle travelling on a route. There are various alarming statistics from all over the world about vehicle accidents resulting from either blind spots caused by improper mirror adjustments or driving while feeling drowsy. According to the national highway traffic safety administration (NHTSA), 840,000 blind spot accidents occur annually in the United States. Moreover, statistics released by Riyadh's General Directorate of Traffic (Saudi Arabia) illustrate that 4000 victims died due to drowsy driving in 2014.

A smart driver safety system is described in which drowsiness and attention diversion are detected and side mirrors of the vehicle are adjusted based on a head position and eye position of the driver. The smart driver safety system includes an automatic mirror adjustment subsystem, an attention diversion monitor subsystem, and a drowsy driver detector. Firstly, the smart driver safety system uses a camera and/or ultrasonic sensor(s) to detect the driver's head position and upper body position and changes the mirror angles using the automatic mirror adjustment subsystem accordingly. Secondly, the drowsy driver detector uses an image processing technique to calculate whether the driver's eyes are open or closed. If eyes are closed, the drowsy driver detection subsystem determines the period during which eyes are closed. The drowsy driver detector further detects whether the upper body position and head position of the driver indicate that the driver is slouching, which provides an early alert that the driver is drowsy. Based on the calculation, the drowsy driver detection subsystem alerts the driver that he/she is drowsy.

Figure 1B:
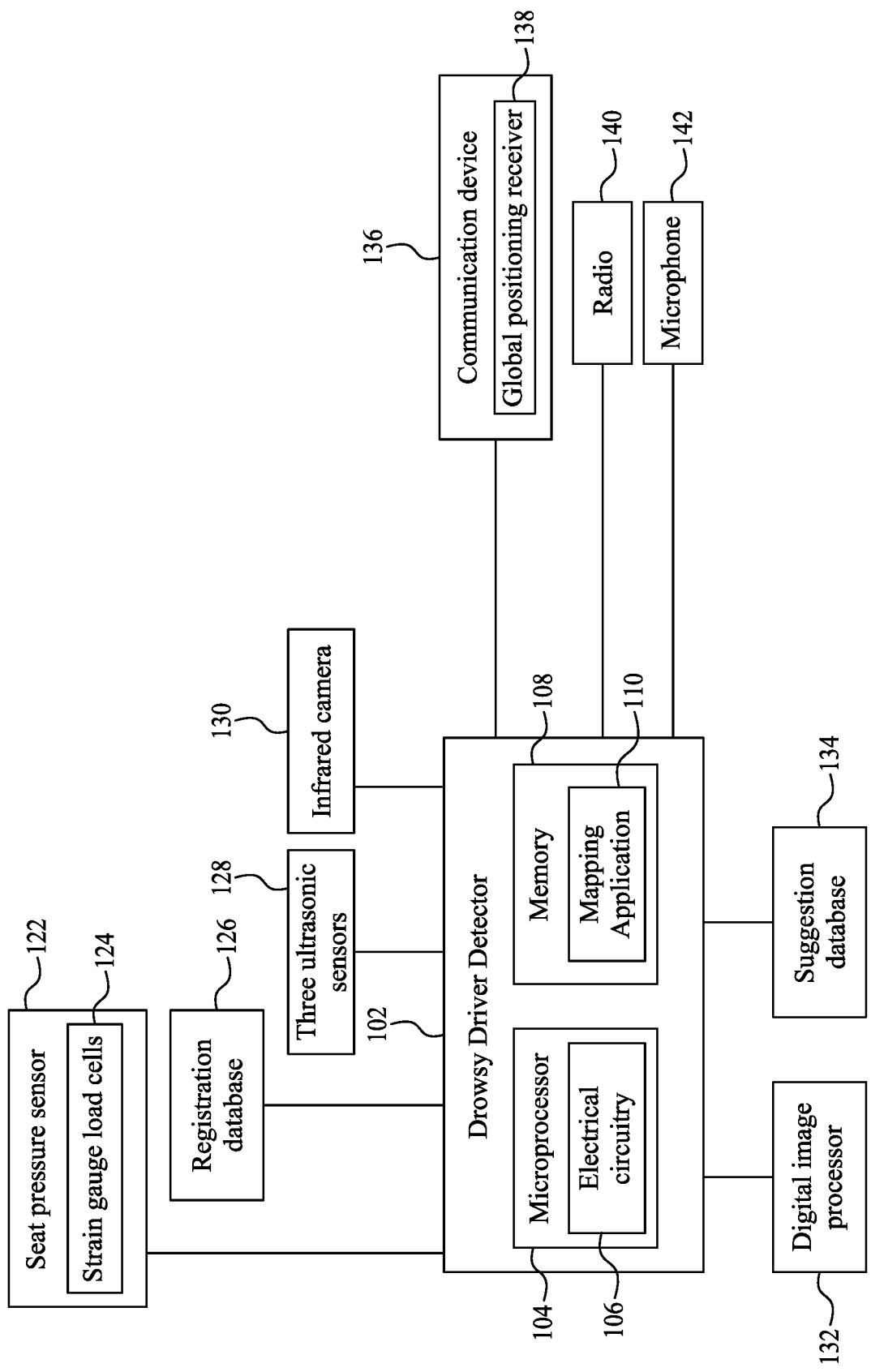
FIG. 1B illustrates a connection diagram of a drowsy driver detector with various components, according to certain embodiments.

FIG. 1A-FIG. 1B illustrate an overall configuration of a smart driver safety system for the driver of the vehicle. FIG. 1A illustrates a block diagram of the smart driver safety system 100 (hereinafter interchangeably referred to as "the system 100"), according to one or more aspects of the present disclosure. As shown in FIG. 1A, the system 100 includes a drowsy driver detector 102, an attention diversion monitor 112, an automatic mirror adjustment subsystem 114, a plurality of actuators 116, at least three ultrasonic sensors 128, and an infrared camera 130.

The drowsy driver detector 102 includes a microprocessor 104, and a memory 108. The memory 108 is configured to store program instructions. The memory 108 is configured to store preprocessed data. In another aspect, the memory 108 is configured to store a plurality of image matrices, eye deviation threshold value, drowsiness threshold value, a plurality of media files, etc. The memory 108 may include any computer-readable medium known in the art including, for example, volatile memory, such as Static Random Access Memory (SRAM) and Dynamic Random Access Memory (DRAM) and/or nonvolatile memory, such as Read Only Memory (ROM), erasable programmable ROM, flash memories, hard disks, optical disks, and magnetic tapes.

The microprocessor 104 is configured to execute the program instructions. The microprocessor 104 includes an electrical circuitry 106. In an aspect, the electrical circuitry 106 is configured to employ preprocessing on the received data (signal) such as filtering and amplifying the received data. For example, the electrical circuitry 106 includes an analog front end that provides filtering, primarily time domain filtration, and amplification of the received signal. The microprocessor 104 is configured to cooperate with the memory 108 to fetch and execute computer-readable program instructions stored in the memory 108. According to an aspect of the present disclosure, the microprocessor 104 may be implemented as one or more microcomputers, microcontrollers, digital signal processors, central processing units, state machines, logic circuitries, and/or any devices that manipulate signals based on operational instructions.

The at least three ultrasonic sensors 128 are communicably connected to the drowsy driver detector 102. The at least three ultrasonic sensors 128 are electronic devices that calculate a distance/location of a target by emission of ultrasonic sound waves. Each of the ultrasonic sensors 128 works by emitting ultrasonic sound waves towards the target. The ultrasonic sound waves are reflected back, and the ultrasonic sensor 128 is configured to receive the reflected waves. The ultrasonic sensor 128 is configured to calculate the distance from the target based on the time elapsed between the emission and reception of the reflected sound waves and to generate an ultrasonic measurement. The ultrasonic sensor 128 is configured to convert the reflected sound waves into electrical signals. In an example, the target is a head and upper body of the driver. The at least three ultrasonic sensors 128 are configured to determine the head position and upper body position of the driver based on the generated ultrasonic measurements. In an example, one of the three ultrasonic sensors 128 is selected as a reception ultrasound sensor which is configured to calculate the head position and/or upper body position using a known triangulation method. The head position may be used to determine whether or not the driver can see the side mirrors, when the driver is looking away from straight ahead, such as looking at a cell phone, a passenger or a center screen. Slouching of the upper body position may indicate the driver is tired or drowsy.

The infrared camera 130 is configured to record eye movements of the eyes of the driver. The infrared camera 130 detects the thermal energy or heat emitted by an object under observation and converts the detected thermal energy into an electronic signal. The electronic signal is processed to produce an image corresponding to the object. The infrared camera is configured to measure a plurality of points on the driver's face. In an aspect, the infrared camera 130 detects features of the face, including the eyes, by comparing the detected thermal energy with a reference temperature (previously detected thermal energy) of the object. In an example, the object is a facial image of the driver or an eye position on the facial image. In one example, the infrared camera 130 is a near-infrared camera, a broad-spectrum infrared camera, a visible camera and a video camera. In an example, the infrared camera 130 is mounted inside the dashboard or on top of the rear-view mirror of the vehicle. In an example, the infrared camera 130 is an infrared Raspberry Pi camera, which is configured to detect drowsiness in low light conditions. In an aspect, the infrared camera 130 is placed strategically to detect the eye movements and any unusual blinking time accurately. The attention diversion monitor may be used to determine when the driver is looking down or from side to side instead of looking straight ahead, which indicates attention diversion. The eye position may be used in conjunction with the head position to determine whether or not the driver can see the side mirrors, when the driver is looking away from straight ahead, such as looking at a cell phone, a passenger or a console screen.

The drowsy driver detector 102 is configured to receive the ultrasonic measurements from each of the three ultrasonic sensors 128 and the recorded eye movements from the infrared camera 130, respectively. Under the program instructions, the drowsy driver detector 102 is configured to determine the head position of the driver. Based on the determined head position of the driver, the system 100 determines the attention diversion of the driver. For example, if the head position of the driver indicates the driver is slouching or is not sitting straight, then the system 100 generates an attention diversion alert signal, saying "sit straight".

After determining the head position, the drowsy driver detector 102 is configured to detect the eye position of the driver's eyes. The drowsy driver detector 102 determines whether the eyes of the driver are closed. When the driver's eyes are closed, the drowsy driver detector 102 determines a time duration of an eye closure. The drowsy driver detector 102 is configured to compare the determined time duration of the eye closure to the drowsiness threshold fetched from the memory 108. On comparison, when the time duration of the eye closure exceeds the drowsiness threshold, the drowsy driver detector 102 generates a drowsiness alert signal. In an example, the drowsy driver detector 102 is configured to receive live video feed from the infrared camera 130 and process the received video feed to determine whether the driver is distracted/drowsy.

In an aspect, the attention diversion monitor 112 is configured to detect an attention diversion of the driver based on the eye position and the eye closure. For example, the attention diversion monitor 112 is configured to monitor the movements of the pupil of the eye to determine the attention of the driver. Based on the detection of the eye position and the eye closure, the attention diversion monitor 112 provides the attention diversion alert signal.

The plurality of actuators 116 is configured to receive the drowsiness alert signal and the attention diversion alert signal from the drowsy driver detector 102 and the attention diversion monitor 112, respectively. On receiving the drowsiness alert signal and the attention diversion alert signal, the plurality of actuators 116 is configured to generate at least one of the drowsiness alert and the attention diversion alert. In an aspect, the plurality of actuators 116 includes a buzzer 118 and a speaker 120. In an aspect, the plurality of actuators 116 includes a theft alarm. The buzzer 118 is configured to receive the attention diversion alert from the attention diversion monitor 112 and generate the audible buzzer sound. In an example, the buzzer 118 is configured to produce a buzz to sound an alarm, a reminder, or a combination thereof. The speaker 120 is configured to receive the attention diversion alert from the attention diversion monitor 112 and generate an audible output, which may include speech, music, messages tailored to the attention status of the driver, messages alerting the driver that the side mirrors will be adjusted, and the like, wherein the messages are generated by the microprocessor.

The automatic mirror adjustment subsystem 114 is configured to adjust at least one side mirror of the vehicle. The microprocessor 104 is configured to determine a gaze direction of the eyes of the driver based on received ultrasonic measurements and the recorded eye movements. Based on the gaze direction, the microprocessor 104 determines whether the driver can see the side mirrors or not. When the microprocessor 104 determines that the driver cannot see the side (or side-view) mirrors, the microprocessor 104 is configured to generate drive signals configured to adjust at least one of the side mirrors. In an operative aspect, the automatic mirror adjustment subsystem 114 is connected to the microprocessor 104 and receives the drive signals from the microprocessor 104. Upon receiving the drive signals, the automatic mirror adjustment subsystem 114 adjusts the at least one side mirror.

FIG. 1B illustrates a connection diagram of the drowsy driver detector 102 with various components of the system 100, according to certain embodiments. As shown in FIG. 1B, the drowsy driver detector 102 is connected to a seat pressure sensor 122, a registration database 126, a digital image processor 132, a suggestion database 134, a communication device 136, a radio 140, and a microphone 142.

The digital image processor 132 is communicably connected to the ultrasonic sensors 128 and the infrared camera 130. In an aspect, there are three ultrasonic sensors. Although three ultrasonic sensors are described in this embodiment, there may be more than three ultrasonic sensors. The number of ultrasonic sensors must be sufficient to effectively image the head pose and upper body of the driver. For example, there may be three upper ultrasonic sensors and three lower ultrasonic sensors, which are actuated in any desirable sequence. The signals received from the three upper ultrasonic sensors and the three lower ultrasonic sensors may be compared to determine a degree of slouching of the driver. The digital image processor 132 receives the ultrasonic measurements from each of the at least three ultrasonic sensors 128 and the recorded eye movements from the infrared camera 130, respectively. The digital image processor 132 is configured to map both the head position and the recorded eye movements to an image matrix fetched from the memory 108 and generate a time series of mapped eye movements. In an aspect, the generated time series of mapped eye movements represents a temporal sequence of digital images of recorded eye movements at different times (t1, t2, t3, . . . ). In an example, the duration of the time between two digital images of recorded eye movements can be varied. The recorded eye movements may be captured over a variety of frequencies or intervals. In an aspect, the digital image processor 132 is a programmed computer, for example a general-purpose digital computer such as a PC, or minicomputer, or a computer that is specially designed for processing digital images. In some aspects, the digital image processor 132 is a microcontroller, digital signal processor, or imaging core. As part of mapping the recorded eye movements, the digital image processor 132 may also perform one or more image editing techniques, e.g., generate the digital image as employing a high dynamic range, noise removal, and so forth.

In an aspect, the digital image processor 132 is configured to employ various image processing technique that involves extraction, filtering, enhancement, and the like, of images using processing operations. For example, every digital image has a corresponding matrix of color and color intensities. Various mathematical operations are performed on these matrices to enhance the corresponding image. An image can be regarded as a function f(x, y) of two continuous variables x and y. To be processed digitally, the digital image has to be sampled and transformed into a matrix of numbers.

In an aspect, the microprocessor 104 receives the time series of mapped eye movements from the digital image processor 132. The microprocessor 104 determines the gaze direction of the eyes of the driver based on the time series of mapped eye movements. For example, the microprocessor 104 compares two continuous temporal sequences of digital images of recorded eye movements and determines the gaze direction. Based on the gaze direction, the microprocessor 104 determines whether the driver can see the side mirrors or not. When the microprocessor 104 determines that the driver cannot see the side (or side-view) mirrors, the microprocessor 104 is configured to generate drive signals configured to adjust at least one of the side mirrors. In an operative aspect, the automatic mirror adjustment subsystem 114 is connected to the microprocessor 104 of the drowsy driver detector 102 and receives the drive signals from the microprocessor 104. Upon receiving the drive signals, the automatic mirror adjustment subsystem 114 adjusts the at least one side mirror.

In an operative aspect, the attention diversion monitor 112 detects the attention diversion of the driver and provides the attention diversion alert signal. To detect the eye position and the eye closure, the attention diversion monitor 112 is configured to receive the time series of mapped eye movements from the digital image processor 132. The attention diversion monitor 112 compares the eye position at each time of the time series to the eye position of at least one previous time. Further, the attention diversion monitor 112 monitors deviations in the eye position from straight ahead and detects a time period of the deviations. The attention diversion monitor 112 compares the time period of the deviations to an eye deviation threshold fetched from the memory 108. Based on the comparison, when the time period of the deviations is greater than the eye deviation threshold, the attention diversion monitor 112 generates the attention diversion alert. The attention diversion monitor 112 is configured to prevent the driver from diverting his attention. In an aspect, the attention diversion monitor 112 is configured to generate regular alerts/reminders after a predetermined time. For example, after each 15 minutes the system 100 generates the alert message saying, "You have been driving for xxx time, stay active".

In an aspect, a suggestion database 134 is connected to the microprocessor 104. The suggestion database 134 includes recommendations for mitigating the driver's drowsiness. For example, the recommendations include digital sound recordings, a list of the next approaching rest stops, a list of the next approaching retail locations, and a safer route. In an aspect, the digital sound recordings include WAV (Waveform Audio File Format) and MP3 (MPEG-1 Audio Layer-3). The microprocessor 104 is configured to generate recommendations for mitigating drowsiness. In an aspect, the recommendations are based on a duration of time greater than the drowsiness threshold. The microprocessor 104 is configured to determine the length of each time duration (drowsiness duration for which the driver is feeling drowsy) greater than the drowsiness threshold. Based on the comparison, the microprocessor 104 matches the time duration to the recommendation stored in the suggestion database 134. Based on the mapping result, the microprocessor 104 generates drive signals to provide the recommendation to the driver through one of the speaker 120 and the buzzer 118. For example, if the driver has been feeling drowsy for a long time, the recommendation may include stopping to rest at a nearby coffee shop. If the driver has just started to feel sleepy or drowsy, the recommendation may be to listen to a high tempo song. The microprocessor 104 generates the drive signals to provide the recommendation to the driver of the vehicle through at least one of the plurality of actuators 116.

In an example, the driver may add his input to the suggestion database 134 manually. For example, the driver may list his favorite coffee shops, list of songs, or a time duration after which the driver may want to take rest. In some examples, the system 100 is configured to the suggestion database 134 by extracting data which can be found online, regarding popular coffee shops, popular rest stops, safer routes, etc. In another example, if the driver connects his smartphone to the system 100 through Wi-Fi, Bluetooth or a wired connection, the system 100 is configured to use data (such as user preferences including most played songs, most visited café, etc.) from the smartphone to build the suggestion database 134.

In response to the audible buzzer sound, it is expected that the driver changes the position of his head or shows signs of alertness. The drowsy driver detector 102 is configured to determine a response of the driver to the recommendation by detecting one or more of a change in the head position and a change in the eye position. When the driver does not respond to the recommendation, the microprocessor 104 is configured to actuate the theft alarm, which generates a loud, sharply blaring noise. In an aspect, the theft alarm can only be switched off manually.

The communication device 136 is communicably connected to the microprocessor 104. The communication device 136 is further connected to a global positioning receiver 138. The global positioning receiver 138 is configured to provide geolocation coordinates of the vehicle to the microprocessor 104. In an example, the global positioning receiver 138 is a global positioning system (GPS) receiver. In an example, the global positioning receiver 138 is a global navigation satellite system (GNSS)-real-time kinematic positioning (RTK) receiver. The communication device 136 is commutatively coupled to a mapping application 110 stored in the memory 108. The mapping application 110 includes a display. The mapping application 110 is configured to show a street map on a route being travelled by the vehicle on the display. In an example, the street map includes at least one location of a retail location and a rest stop along the route. In an aspect, the mapping application 110 further includes the geolocation coordinates of the vehicle. In some examples, the mapping application 110 is configured to show any road hazards on the route. The mapping application 110 is further configured to show alternate routes including any road hazards on the alternate routes. The mapping application 110 is set up to generate a map based on the extracted information, such as the current location of the vehicle, a target location (fed by the driver on starting the travel, determined from calendar of the user, etc.), and distance from the current location. The mapping application 110 is configured to render the map on the display with the current location of the vehicle on the map. In an aspect, the mapping application 110 is configured to exchange data with a user that has installed the mapping application 110 on a different computing device. For example, the user that has installed the mapping application 110 on his computing device may be configured to track the current location of the vehicle.

In an aspect, the microprocessor 104 is further configured to add recommendations to the suggestion database 134. For example, the recommendations include at least one of a recommendation to stop at the at least one of the retail location and recommendation to stop at the rest stop along the route. The microprocessor 104 is configured to generate the drive signals to actuate the speaker 120 to provide the recommendation to the driver when the time duration of the eye closure is greater than the drowsiness threshold. For example, the speaker 120 may play a voice message "let's have a coffee break at next coffee shop".

In the task of determining the drowsiness of the driver, the microprocessor 104 is configured to determine a safest route and add a recommendation to the suggestion database 134 that the driver should drive on the safest route.

The radio 140 is configured with a plurality of music playing channels. In an example, the radio 140 is configured to play music from one of the music playing channels or music application through the speaker 120. The microprocessor 104 is configured to search the music playing channels and identify a music playing channel with drowsiness mitigating music. In an aspect, the microprocessor 104 is further configured to increase a volume of the radio 140 and play the drowsiness mitigating music when the time duration is greater than the drowsiness threshold.

The microphone 142 is connected to the drowsy driver detector 102. The microprocessor 104 is configured to receive a driver recommendation for mitigating drowsiness through the microphone 142 and add the driver recommendation to the suggestion database 134.

In an aspect, the system 100 includes the seat pressure sensor 122 that is configured to detect a weight of a seat occupant of a driver's seat of the vehicle and generate a weight value. In an aspect, the seat pressure sensor 122 includes at least two strain gauge load cells 124. The at least two strain gauge load cells are located beneath the driver's seat. The strain gauge load cells converts an input mechanical force such as load, weight, tension, compression or pressure into another physical variable, such as, into an electrical output signal. As the force applied to the seat pressure sensor 122 increases, the electrical signal changes proportionally. The at least two strain gauge load cells are configured to generate strain gauge signals corresponding to the applied weight of the driver. The seat pressure sensor 122 is configured to determine the weight based on the strain gauge signals. The microprocessor 104 is commutatively coupled with the seat pressure sensor 122 and receives the weight value from the seat pressure sensor 122. The microprocessor 104 is configured to compare the received weight to a weight threshold fetched from the memory 108 and the registration database 126. The registration database 126 is configured to store at least one driver profile. For example, the driver profile includes various details such as a weight of the driver of the vehicle, where the weight threshold is about a registered weight of the driver. The weights of different drivers of the vehicle may be entered manually into the mapping database. Alternatively, the weight of each driver may be determined by the strain gauge load cells 124 to first time an identified driver enters the vehicle, and may be used as a means of identifying the driver, the age of the driver, the height of the driver, and the like, so as to determine whether or not the driver is a child or a registered adult. In an aspect, the weight threshold is about 50 kg. On comparison, when the received weight is less than the weight threshold, the microprocessor 104 is configured to determine that the seat occupant is not the driver. On the other hand, when the weight is equal to or greater than the weight threshold, the microprocessor 104 is configured to determine that the seat occupant is the driver and activate the drowsy driver detector 102.

In an overall aspect, the present system 100 increases driver safety by performing following functions:
1. Perform automatic adjustment of side-view and rear-view mirrors, using the infrared camera 130 and the ultrasonic sensors 128, by tracking the driver's eyes and head position. The automatic adjustment of side-view and rear-view mirrors minimizes accidents due to blind spots and misalignment of the side-view mirror and the rear-view mirror.
2. Detect attention diversion of the driver: the attention diversion monitor 112 is configured to observe the driver continuously and for longer than a predefined time. If the attention diversion monitor 112 finds that the driver is distracted, the attention diversion monitor 112 alerts the driver. In an example, the predefined time is 2 seconds. In an aspect, the loss of attention may be due to the following reasons:
    a. Looking sideways
    b. Using an on-board LCD screen
    c. Use of a mobile phone
3. Detect the driver's drowsiness and alert the driver by generating an audio alarm. Drowsiness is frequently due to the monotonous activity of driving for long periods of time and also due to physical stress or tiredness. The system 100 is configured to keep the driver focused, engaged, and mentally active by playing songs, news, generating alarms, etc. Further, the system 100 is configured to suggest the driver get some rest and drink coffee.

Figure 2A:
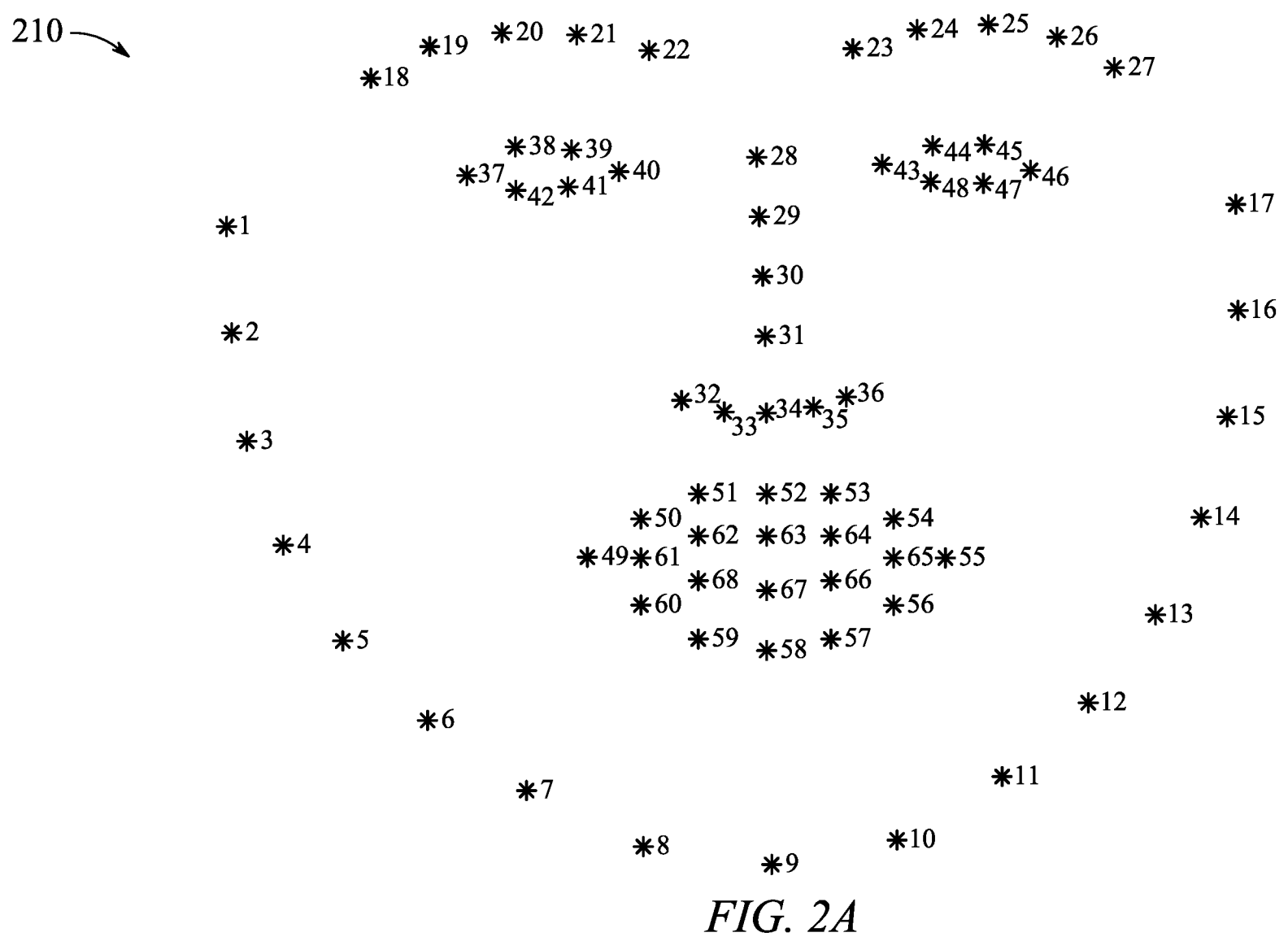

FIG. 2A is an exemplary illustration 210 of visualizing the facial landmark coordinates, according to certain embodiments. In an aspect, the system 100 is configured to perform an enrollment of the driver with the system 100 by capturing a number of facial images taken along different angles. In some embodiments, the system 100 is configured to capture a facial image of the driver when the driver is about to start a journey, as at that time the driver is active and attentive. The system 100 is configured to save the captured facial images into the memory 108. In an example, the infrared camera 130 records the facial image of the driver. The drowsy driver detector 102 is communicably connected to the infrared camera 130 and receives the recorded facial image. The microprocessor 104 is configured to employ a feature extractor algorithm on the received facial image(s) to extract features and the facial landmark coordinates of the image. During the feature extraction, the captured facial image is processed and converted into a compact digital representation called a facial reference template. These facial reference template(s) are stored in the memory 108. For example, the feature extractor algorithm may be a computer vision algorithm, a deep neural network trained for feature extraction, or another type of feature extractor algorithm.

Further, the feature extractor algorithm may be configured to perform component detection and face alignment. First, the feature extractor algorithm detects and identifies facial features at different orientations and locations. It would be unrealistic to expect the driver to remain seated in the same position for an extended period of time with his head directly facing the infrared camera 130. The feature extractor algorithm is configured to label extracted facial features with enough landmarks that can be employed for inferring the locations of the eyes, nose, lips, forehead, and boundary of the face.

The steps performed by the feature extractor algorithm may be summarized as follows:
1. Determining a face feature calibration point of the driver based on the captured facial image of the driver. In an example, as shown in FIG. 2A, the face may have 68 calibration points. These 68 calibration points are used for calibrating the contour of the face, the mouth shape, the eye contour, the eyebrow shape, and the nose shape, respectively.
2. Based on the 68 calibration points, the microprocessor 104 detects the position of the driver's eyes.

In an aspect, the feature extractor algorithm may be configured to determine a plurality of expression features by determining the facial feature calibration point of the driver and calculating whether each expression feature exceeds a corresponding predetermined fatigue expression threshold value. Based on the 68 calibration points, the contour, mouth shape, eye contour, eyebrow shape, and nose shape of the face can be determined, as can the fatigue expression of the driver. For example, the feature extractor algorithm detects whether to yawn based on the mouth shape and the contour of the face, whether the eyes are wide open or not, whether the eyes are semi-closed, and the like, based on the determined fatigue expression of the driver. A threshold value for each fatigue expression may be predetermined and stored in the memory 108. The micro-expression of the driver determines whether a corresponding fatigue expression represents eye fatigue or not. For example, for a yawning expression, a threshold for mouth opening may be set, and when the mouth opening exceeds the threshold, yawning may be determined. The opening size of the mouth can be determined according to the area of the enclosing cavity at each index point of the mouth.

In the event that the drowsy driver detector 102 is configured to receive a live streaming video from the infrared camera 130, the feature extractor algorithm is configured to extract a plurality of single-frame facial images from the live streaming video. The feature extractor algorithm is configured to calculate an eye key point coordinate corresponding to each of the single-frame facial images. FIG. 2A shows the landmark coordinates corresponding to the driver's eyes. Each pair of eyes has six (6) key points, for a total of twelve (12) key points.

Figure 2B:
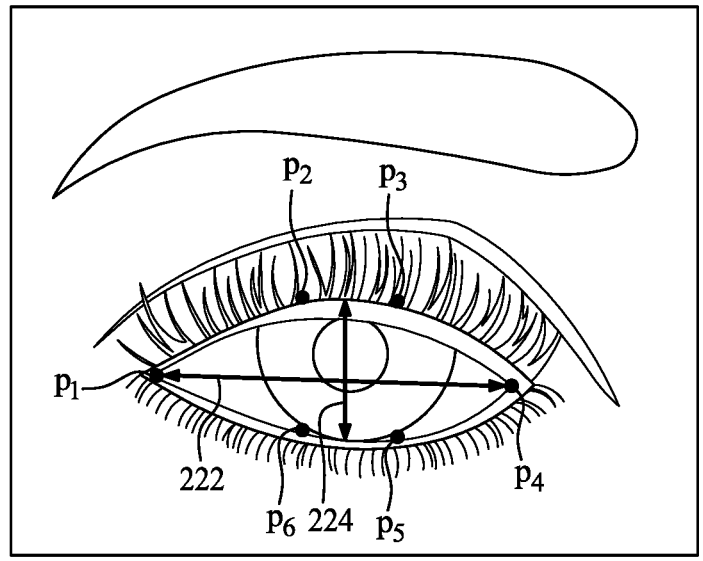
FIG. 2B is an exemplary illustration of landmark coordinates corresponding to an open eye, according to certain embodiments.

FIG. 2B is an exemplary illustration 220 of the landmark coordinates corresponding to an open eye, according to certain embodiments. For example, the system 100 takes the landmark coordinates corresponding to the left eye of the driver to determine the state of the eye.

As shown in FIG. 2B, when the eye is opened, and the driver is fully awake, reference 222 represents a horizontal line between the lateral canthus and the medium canthus. Reference 224 represents a vertical line between the upper lid (superior palpebrae) and the lower lid (inferior palpebrae).

The feature extractor is further configured to calculate an eye aspect ratio (EAR) corresponding to each of the plurality of single-frame facial images according to the calculated eye key point coordinate using the following equation.

$$EAR = \frac{\|p_2 - p_6\| + \|p_3 - p_5\|}{2\|p_1 - p_4\|}. \tag{1}$$

A smaller EAR indicates that the person is drowsy. In an aspect, there are numerous libraries in the existing knowledge that take frames from a video and return landmarks as pixel coordinates. In an aspect, according to the calculated EAR, the microprocessor 104 is configured to determine whether the driver blinks or not. In some examples, the microprocessor 104 is configured to determine the blinking rate also. In an example, a calibration sequence is initiated when the system 100 is first used in order to calculate accurate EARs corresponding to the driver.

Figure 2C:
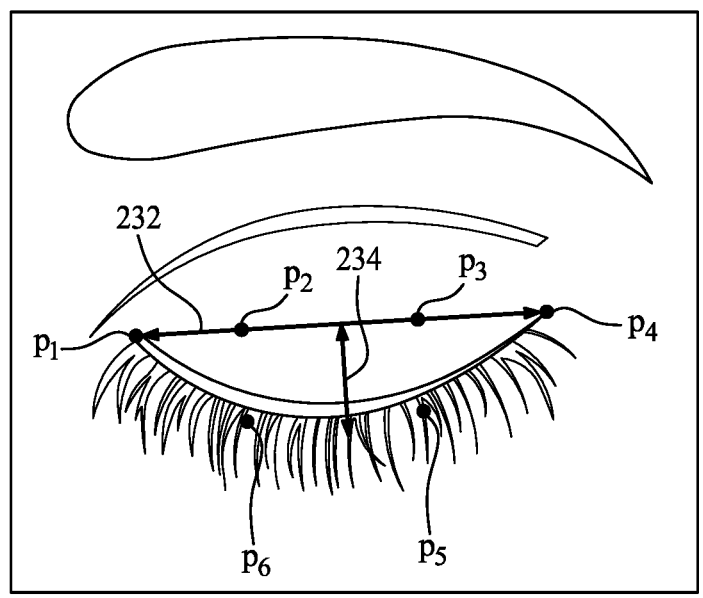
FIG. 2C is an exemplary illustration of landmark coordinates corresponding to a closed eye, according to certain embodiments.

FIG. 2C is an exemplary illustration 230 of the landmark coordinates corresponding to t closed eye, according to certain embodiments. As shown in FIG. 2B, when the eye is closed, reference 232 represents a horizontal line (horizontal distance) between the lateral canthus and the medium canthus. Reference 234 represents a vertical distance between the horizontal line 232 and the lower lid (inferior palpebrae).

When the system 100 detects that the EAR over a particular time period is low, the system 100 infers that the driver is starting to get drowsy. The system 100 is configured to alert systems on the vehicle (if any) to partially take over control from the driver. For example, the speed of the vehicle can be limited. The car can also be partially steered by the systems on board the vehicle.

When the EAR values are dangerously low, the system 100 infers that the driver has fallen asleep. In such cases, the system 100 plays loud audio clips in order to wake the driver up. The system 100 can also alert relevant contacts, letting them know of the situation. If the car has autonomous systems, it can find a safe parking spot where the vehicle can be parked until it can be safely determined that the driver is fully awake.

Figure 3A:
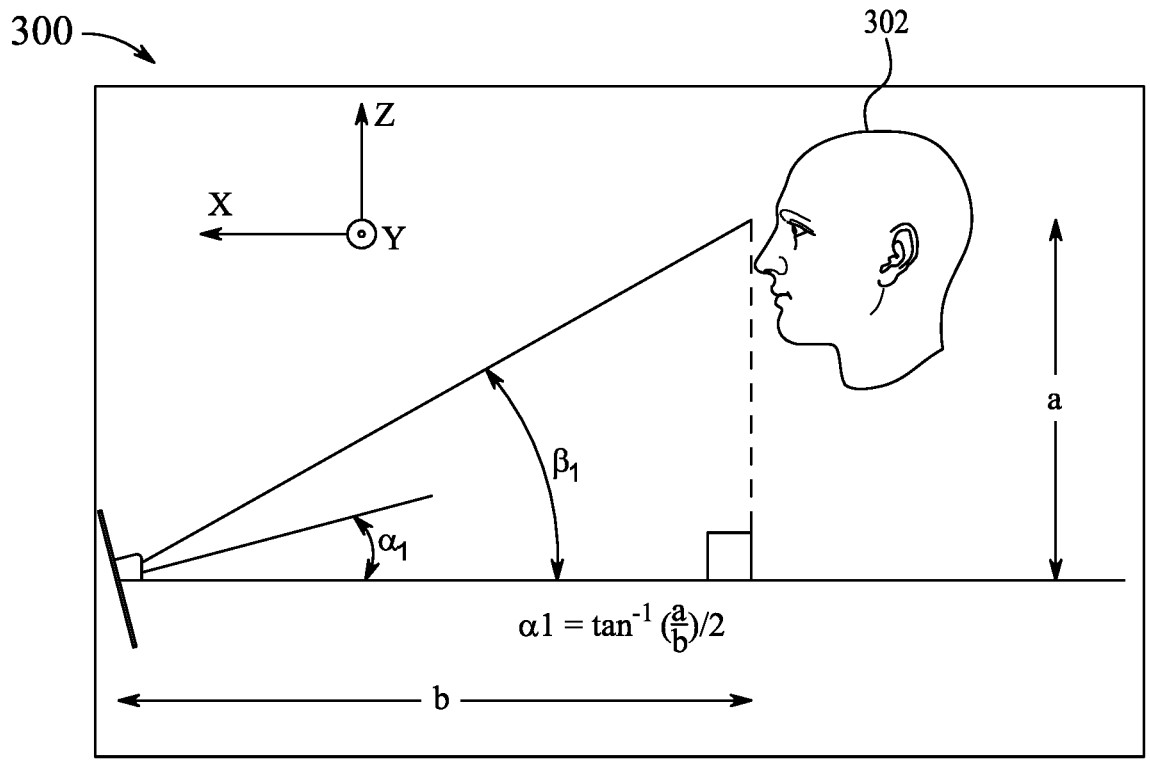
FIG. 3A is an exemplary illustration of determining an angle of a mirror from a side view of a head of the driver, according to certain embodiments.

FIG. 3A is an exemplary illustration 300 of determining an angle of a mirror from a side view of the head of the driver 302, according to certain embodiments. A common mistake that numerous drivers make is to set their side mirrors so that they can see the side of the car. However, this process leaves the driver with a dangerous blind spot.

The automatic mirror adjustment subsystem 114 calculates the present angle of the mirror. The automatic mirror adjustment subsystem 114 also determines the required angle of the mirrors (side mirror and rear-view mirror) based on the gaze direction and the head position of the driver.

Figure 3B:
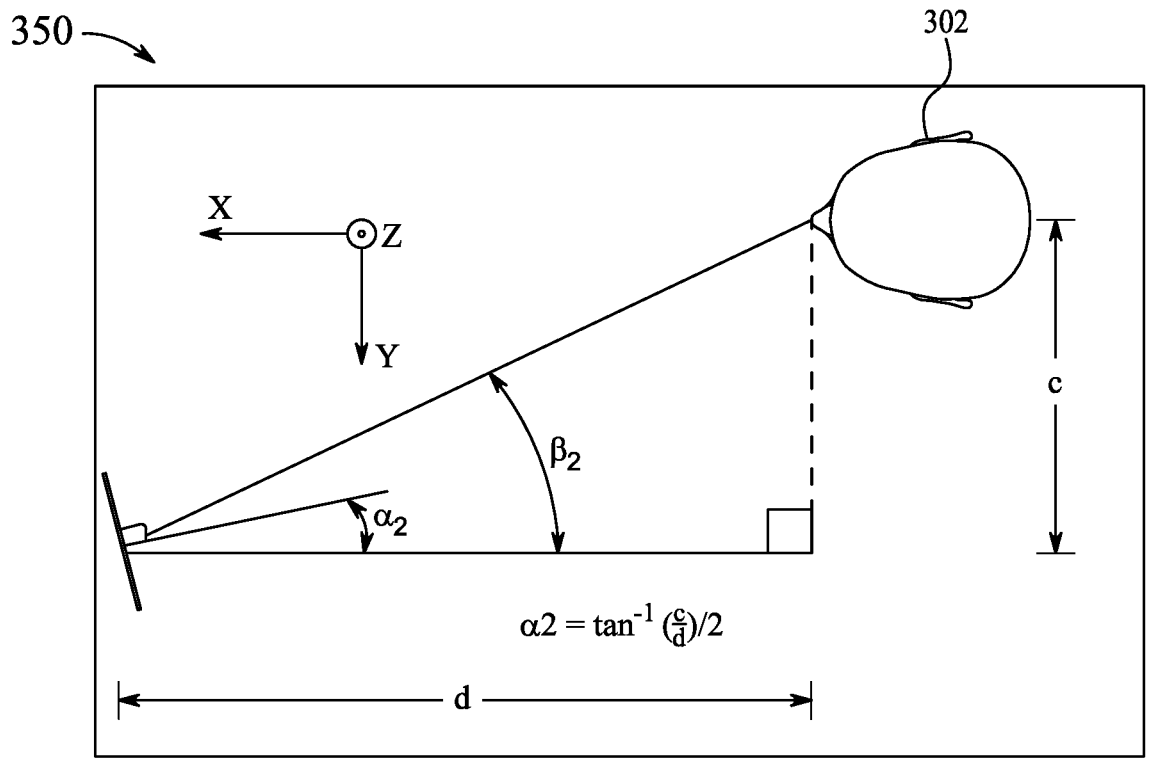
FIG. 3B is an exemplary illustration of determining an angle of the mirror from a top view of the head of the driver, according to certain embodiments.

The system 100 uses geometry coordinates to obtain a mathematical formula that gives the desired angle of the side mirrors according to the current position of the driver. As shown in FIG. 3A-FIG. 3B, there are two types of mirror movements: a yaw movement and a pitch movement. The system 100 assumes that the driver is only looking at objects in line with the rotational point of the mirror. A ray of light hits a plane mirror at an angle that is equal to the exit angle if the mirror is positioned at the required angle. The exiting ray of light forms a horizontal line, then the angle α will be equal to half R as with the different view of the head position. In an example, R is an angle formed by the head of the driver with the side mirrors. If distances a, b, c, and d are known, then the angle α can be measured using the microprocessor 104.

In the situation where the angle of the light from the side mirror is different than α, then the angle α will not be equal to half β. To adjust the angle of the mirror according to the head position of the driver, the automatic mirror adjustment subsystem 114 calculates an angle $α_1$.

$$\alpha_1 = \tan^{-1}\left(\frac{a}{b}\right)/2 \tag{2}$$

In an aspect, the angle $α_1$ is equal to half $β_1$.

FIG. 3B is an exemplary illustration 350 of determining an angle of a mirror from a top view of the head of the driver 302, according to certain embodiments. As shown in FIG. 3B, the automatic mirror adjustment subsystem calculates the present angle of the mirror and also determines a required angle of the mirrors from the top view of the head of the driver 302.

In the situation where the angle of the side mirror is different from a, then the angle α will not be equal to half β. To make the angle of the mirror according to head position of the driver, the automatic mirror adjustment subsystem calculates an angle $α_2$.

$$\alpha_2 = \tan^{-1}\left(\frac{c}{d}\right)/2 \tag{3}$$

In an aspect, the angle $α_2$ is equal to half $α_2$.

Figure 4C:
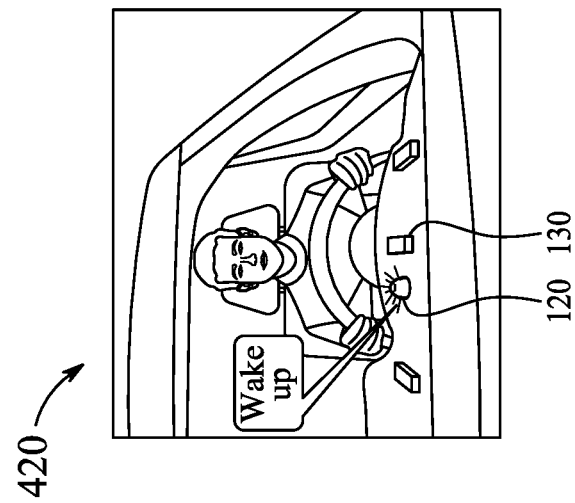
FIG. 4C illustrates an exemplary representation of slumping of the driver based on the analysis performed by the drowsy driver detector, according to certain embodiments.
Figure 4B:
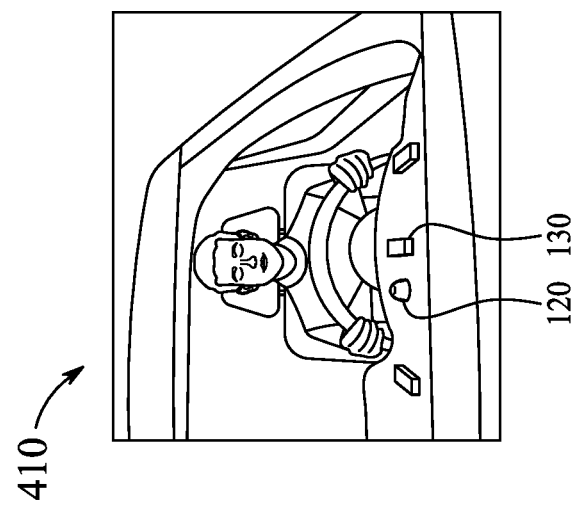
FIG. 4B illustrates an exemplary representation of the driver with closed eyes, according to certain embodiments.
Figure 4A:
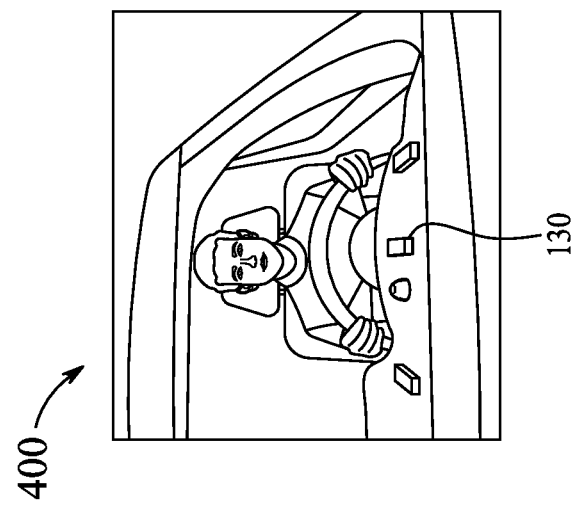
FIG. 4A illustrates an exemplary representation of the driver with opened eyes, according to certain embodiments.

FIG. 4A-FIG. 4C illustrate an exemplary representation of the slumping of the driver based on the analysis performed by the drowsy driver detector 102, according to certain embodiments.

FIG. 4A illustrates an exemplary representation 400 of the driver with opened eyes, according to certain embodiments. As shown in representation 400 of FIG. 4A, the infrared camera 130 and at least three ultrasonic sensors 128 have been positioned inside the vehicle aimed directly at the driver. The drowsy driver detector 102 receives the ultrasonic measurements of the head position of the driver from each of at least three ultrasonic sensors 128 and the recorded eye movements of the driver from the infrared camera 130. Based on the received inputs, the drowsy driver detector 102 detects the position of the driver's eyes. The drowsy driver detector 102 determines whether the eyes of the driver are closed. As shown in FIG. 4A, the eyes of the driver are opened.

FIG. 4B illustrates an exemplary representation 410 of the driver with closed eyes, according to certain embodiments. As shown in FIG. 4B, if the driver's eyes are closed, the drowsy driver detector 102 determines the duration of eye closure. The drowsy driver detector 102 compares the determined time duration to the drowsiness threshold fetched from the memory. If the determined time duration exceeds the drowsiness threshold, the drowsy driver detector 102 considers that the driver is drowsy and generates the drowsiness alert signal.

FIG. 4C illustrates an exemplary representation 420 of alerting the driver based on the analysis performed by the drowsy driver detector 102, according to certain embodiments. As shown in FIG. 4C, the plurality of actuators 116, either the speaker or the buzzer, generates the drowsiness alert. In an example, the drowsiness alert is an alarm, a voice message, or a song. Further, the drowsy driver detector 102 is configured to activate the radio 140 to play music from one of the music channels through the speaker 120.

In an exemplary aspect, if the driver is drowsy, to keep the driver focused, engaged, and mentally active, following functions can be performed by the system 100:
1. Alert the driver by generating an audio alarm or play personalized pre-recorded messages such as "Wake up John", "Come on John, wake up! !".
2. Playing music that keeps the driver awake.
3. Playing suggestions fetched from the suggestion database to the driver such as getting some rest, drinking coffee, etc.

FIG. 5A-FIG. 5C illustrate an exemplary representation of slumping of the driver based on the analysis performed by the attention diversion monitor 112, according to certain embodiments.

FIG. 5A illustrates an exemplary representation 500 of the driver when the driver is attentive, according to certain embodiments. As shown in representation 500 of FIG. 5A, the infrared camera 130, and at least three ultrasonic sensors 128 have been positioned inside the vehicle focused directly on the driver. The attention diversion monitor 112 is configured to receive the detected eye position of the driver's eyes and eye closure duration from the drowsy driver detector 102. In an aspect of the present disclosure, the digital image processor 132, connected to the drowsy driver detector 102, receives the ultrasonic measurements and the recorded eye movements and maps both the head position and the recorded eye movements to the image matrix. Based on the mapping, the digital image processor 132 generates the time series of mapped eye movements. The attention diversion monitor 112 receives the time series of mapped eye movements and compares the eye position at different times of the time series. The attention diversion monitor 112 monitors deviations in the eye position from straight ahead and detects a time period of the deviations. As shown in FIG. 5A, the head position of the driver is straight, and the driver is attentive.

FIG. 5B illustrates an exemplary representation 510 of the driver when the driver is distracted, according to certain embodiments. The attention diversion monitor 112 compares the time period of the deviations to the eye deviation threshold fetched from the memory 108. When the time period of the deviations is greater than the eye deviation threshold, the attention diversion monitor 112 provides the attention diversion signal.

FIG. 5C illustrates an exemplary representation 520 of alerting of the driver based on the analysis performed by the attention diversion monitor 112, according to certain embodiments. As shown in FIG. 5C, the plurality of actuators 116, either the buzzer 118 or the speaker 120, receives the attention diversion signal from the attention diversion monitor 112 and generates the attention diversion alert. In an example, the attention alert is an alarm or a voice message. For example, the speaker 120 generates an audio message such as "Pay attention".

The first embodiment is illustrated with respect to FIG. 1A-FIG. 5C. The first embodiment describes the smart driver safety system 100 for a vehicle. The smart driver safety system 100 includes a plurality of ultrasonic sensors configured to generate ultrasonic measurements of a head and an upper body of a driver of the vehicle; an infrared camera configured to measure a plurality of features on the driver's face; the drowsy driver detector 102, the attention diversion monitor 112, the automatic mirror adjustment subsystem 114, and the plurality of actuators 116. The drowsy driver detector 102 is configured with the microprocessor 104 having the electrical circuitry 106, the memory 108 configured to store program instructions and the microprocessor 104 configured to execute the program instructions. The drowsy driver detector 102 is configured to: determine a head position of the driver, determine when the upper body is in a slouched position, detect an eye position of the driver's eyes, determine whether the eyes of the driver are closed, when the driver's eyes are closed, determine a time duration of an eye closure, compare the time duration to a drowsiness threshold, and when the eye closure exceeds the drowsiness threshold, generate a drowsiness alert signal. The attention diversion monitor 112 is configured to detect deviations of the eyes of the driver from a straight ahead position and provide an attention diversion alert signal. The plurality of actuators 116 is configured to provide at least one of the drowsiness alert and the attention diversion alert. The automatic mirror adjustment subsystem 114 is configured to adjust at least one side mirror of a vehicle.

In an aspect of the present disclosure, the smart driver safety system 100 includes a seat pressure sensor 122 configured to detect a weight of a seat occupant of a driver's seat of the vehicle. The microprocessor 104 is configured to: receive the weight; compare the weight to a weight threshold; when the weight is less than the weight threshold, determine that the seat occupant is not the driver; and when the weight is equal to or greater than the weight threshold, determine that the seat occupant is the driver and activate the drowsy driver detector 102.

In an aspect of the present disclosure, the weight threshold is about 50 kg.

In an aspect, the smart driver safety system 100 includes a registration database 126 connected to the microprocessor 104. The registration database 126 includes the weight of the driver of the vehicle and the weight threshold is about the weight of the driver.

In an aspect, the seat pressure sensor 122 includes at least two strain gauge load cells 124 located beneath the driver's seat. The at least two strain gauge load cells 124 generate strain gauge signals. The seat pressure sensor 122 is configured to determine the weight based on the strain gauge signals.

In an aspect, the smart driver safety system 100 includes at least three ultrasonic sensors 128 connected to the drowsy driver detector 102. The at least three ultrasonic sensors 128 are configured to generate ultrasonic measurements of the head position and upper body position of the driver. In an aspect, the smart driver safety system 100 includes an infrared camera 130 communicably connected to the drowsy driver detector 102. The infrared camera 130 is configured to record eye movements of the eyes of the driver. In an aspect, the smart driver safety system 100 includes a digital image processor 132 connected to the drowsy driver detector 102. The digital image processor 132 is configured to receive the ultrasonic measurements and the recorded eye movements, map both the head position and the recorded eye movements to an image matrix and generate a time series of mapped eye movements. In an aspect, the microprocessor 104 is configured to: receive the time series of mapped eye movements, determine a gaze direction of the eyes of the driver based on the time series of mapped eye movements, determine whether the driver can see the side mirrors based on the gaze direction, when the driver cannot see the side mirrors, generate drive signals configured to adjust at least one of the side mirrors; and the adjustment subsystem is connected to the drowsy driver detector and is configured to receive the drive signals from the microprocessor 104 and adjust the at least one side mirror based on the drive signals.

In an aspect, the attention diversion monitor 112 is further configured to: receive the time series of mapped eye movements; compare the eye position at each time of the time series to the eye position of at least one previous time; monitor deviations in the eye position from straight ahead; detect a time period of the deviations; compare the time period of the deviations to an eye deviation threshold; and provide the attention diversion alert when the time period of the deviations is greater than the eye deviation threshold.

In an aspect, the plurality of actuators 116 includes a buzzer 118 configured to receive the attention diversion alert and generate the audible buzzer sound.

In an aspect, the smart driver safety system 100 includes at least a buzzer 118 and a speaker 120 included in the plurality of actuators 116; a suggestion database 134 comprising recommendations for mitigating drowsiness. The recommendations are based on a length of the time duration greater than the drowsiness threshold; and the microprocessor 104 is configured to determine the length of each time duration greater than the drowsiness threshold, match the time duration to a recommendation in the database, and generate drive signals to provide the recommendation to the driver through one of the speaker 120 and the buzzer 118.

In an aspect, the smart driver safety system 100 includes a communication device 136 connected to the microprocessor 104; a global positioning receiver 138 connected to the communication device 136. The global positioning receiver 138 is configured to provide geolocation coordinates of the vehicle to the microprocessor 104; and a mapping application 110 stored in the memory 108. The mapping application 110 is configured to show a street map on a route being travelled by the vehicle. The street map includes a location of at least one of a retail location and a rest stop along the route. The mapping application 110 further includes the geolocation coordinates of the vehicle. In an aspect, the microprocessor 104 is further configured to add recommendations to the suggestion database 134. The recommendations at least one of a recommendation to stop at the at least one of a retail location and recommendation to stop at a rest stop along the route; and the microprocessor 104 is configured to generate the drive signals to actuate the speaker 120 to provide the recommendation to the driver.

In an aspect, the mapping application 110 is configured to show any road hazards on the route and alternate routes including any road hazards on the alternate routes. The microprocessor 104 is further configured to determine a safest route and add a recommendation to the suggestion database 134 that the driver should drive on the safest route; and to generate the drive signals to actuate the speaker 120 to provide the recommendation to the driver when the time duration is greater than the drowsiness threshold.

In an aspect, the smart driver safety system 100 includes a radio 140 connected to the microprocessor 104. The radio 140 is configured with a plurality of music playing channels. The radio 140 is configured to play music of one of the music playing channels through the speaker 120. The microprocessor 104 is further configured to search the music playing channels and identify a music playing channel with drowsiness mitigating music; and the microprocessor 104 is further configured to increase a volume of the radio 140 and play the drowsiness mitigating music when the time duration is greater than the drowsiness threshold.

In an aspect, the plurality of actuators 116 includes a theft alarm. The drowsy driver detector 102 is configured to determine a response of the driver to the recommendation by one or more of a change in the head position and a change in the eye position; and the microprocessor 104 is configured to actuate the theft alarm when the driver does not respond to the recommendation.

In an aspect, the smart driver safety system 100 includes a microphone 142 connected to the microprocessor 104. The microprocessor 104 is configured to receive a driver recommendation for mitigating drowsiness through the microphone 142 and add the driver recommendation to the suggestion database 134.

The second embodiment is illustrated with respect to FIG. 1A-FIG. 5C. The second embodiment describes a method for mitigating drowsiness and attention diversion of a driver of a vehicle travelling on a route. The method performing, by a drowsy driver detector including an electrical circuitry, a memory configured to store the program instructions and a microprocessor configured to execute the program instructions, the steps of: determining, from measurements generated by a plurality of ultrasonic sensors, a head position and an upper body position of the driver; detecting, from images taken by an infrared camera, an eye position of the driver's eyes; determining whether the eyes of the driver are closed; when the driver's eyes are closed, determining a time duration of an eye closure; comparing the time duration to a drowsiness threshold; and when the eye closure exceeds the drowsiness threshold, generating a drowsiness alert signal. The method includes detecting, by an attention diversion monitor 112 connected to the drowsy driver detector, an attention diversion of the driver based on the eye position and the eye closure and provide an attention diversion alert signal. The method includes providing, by at least one of a plurality of actuators 116, at least one of the drowsiness alert and the attention diversion alert. The method includes adjusting, by an automatic mirror adjustment subsystem 114 connected to the microprocessor 104, at least one side mirror of a vehicle.

In an aspect, the method includes generating, by at least three ultrasonic sensors 128 connected to the drowsy driver detector 102, ultrasonic measurements of the head position of the driver; recording, by an infrared camera 130 communicably connected to the drowsy driver detector 102, eye movements of the eyes of the driver; receiving, by a digital image processor 132 connected to the drowsy driver detector 102, the ultrasonic measurements and the recorded eye movements, mapping both the head position and the recorded eye movements to an image matrix and generating a time series of mapped eye movements; receiving, by the microprocessor 104, the time series of mapped eye movements, determining a gaze direction of the eyes of the driver based on the time series of mapped eye movements, determining whether the driver can see the side mirrors based on the gaze direction, when the determination is made that the driver cannot see the side mirrors, generating drive signals configured to adjust at least one of the side mirrors; and receiving, by the automatic mirror adjustment subsystem 114, the drive signals from the microprocessor 104 and adjusting the at least one side mirror based on the drive signals. In an aspect, the method includes generating, by the microprocessor 104, recommendations for mitigating drowsiness. The recommendations are based on a length of the time duration greater than the drowsiness threshold; storing, by the microprocessor 104, the recommendations in a suggestion database 134; determining, by the microprocessor 104, the length of each time duration greater than the drowsiness threshold, matching the time duration to a recommendation in the database; and generating, by the microprocessor 104, drive signals to provide the recommendation to the driver of the vehicle through at least one of the plurality of actuators 116.

In an aspect, the method includes connecting a communication device 136 to the microprocessor 104; providing, by a global positioning receiver 138 connected to the communication device 136, geolocation coordinates of the vehicle to the microprocessor 104; and storing a mapping application 110 in the memory 108. The mapping application 110 includes a display and is configured to show, on the display, a street map on a route being travelled by the vehicle. The street map includes a location of at least one of a retail location and a rest stop along the route. The mapping application 110 further includes the geolocation coordinates of the vehicle; adding, by the microprocessor 104, recommendations to the suggestion database 134. The recommendations include at least one of a recommendation to stop at the at least one of a retail location and recommendation to stop at a rest stop along the route; and generating, by the microprocessor 104, drive signals configured to actuate at least one of the plurality of actuators 116 to provide the recommendation to the driver. The at least one of the plurality of actuators 116 is a speaker 120.

In an aspect, the method includes showing, on the display of the mapping application, any road hazards on the route; showing, on the display of the mapping application, alternate routes including any road hazards on the alternate routes; determining, by the microprocessor 104, a safest route based on the road hazards on each route; adding, by the microprocessor 104, a recommendation to the suggestion database 134 that the driver should drive on the safest route; and generating, by the microprocessor 104, the drive signals to actuate the speaker 120 to provide the recommendation to the driver when the time duration is greater than the drowsiness threshold.

The third embodiment is illustrated with respect to FIG. 1A-FIG. 5C. The third embodiment describes a non-transitory computer readable medium having instructions stored therein that, when executed by one or more processors, cause the one or more processors to perform a method for mitigating drowsiness and attention diversion of a driver of a vehicle travelling on a route. The method includes determining, from measurements generated by a plurality of ultrasonic sensors, a head position and an upper body position of the driver; detecting, from images taken by an infrared camera, an eye position of the driver's eye. The method includes determining whether the eyes of the driver are closed. When the driver's eyes are closed, the method includes determining a time duration of an eye closure and comparing the time duration to a drowsiness threshold. When the eye closure exceeds the drowsiness threshold, the method includes generating a drowsiness alert signal. The method includes detecting, by an attention diversion monitor 112, attention diversion of the driver based on the eye position and the eye closure and provide an attention diversion alert signal. The method includes providing, by at least one of a plurality of actuators 116, at least one of the drowsiness alert and the attention diversion alert.

The method includes adjusting, by an automatic mirror adjustment subsystem 114 connected to the microprocessor 104, at least one side mirror of a vehicle.

Figure 6:
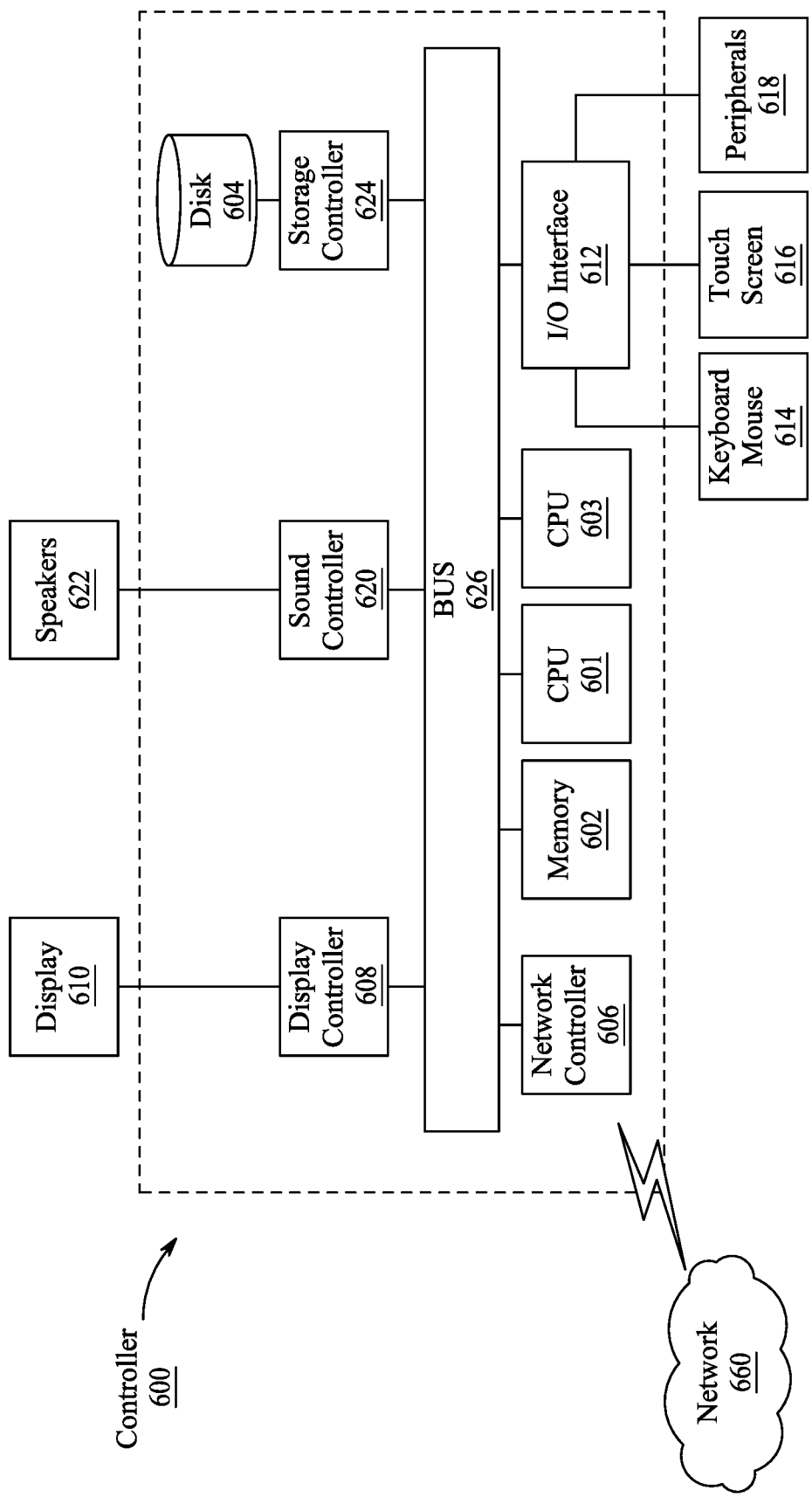
FIG. 6 is an illustration of a non-limiting example of details of computing hardware used in the computing system, according to certain embodiments.

Next, further details of the hardware description of the computing environment of FIG. 1A according to exemplary embodiments is described with reference to FIG. 6. In FIG. 6, a controller 600 is described as representative of the microprocessor 104 of FIG. 1A in which the controller is a computing device which includes a CPU 601 which performs the processes described above/below. The process data and instructions may be stored in memory 602. These processes and instructions may also be stored on a storage medium disk 604 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 601, 603 and an operating system such as Microsoft Windows 9, Microsoft Windows 10, UNIX, Solaris, LINUX, Apple MAC-OS and other systems known to those skilled in the art.

The hardware elements in order to achieve the computing device may be realized by various circuitry elements, known to those skilled in the art. For example, CPU 601 or CPU 603 may be a Xenon or Core processor from Intel of America or an Opteron processor from AMD of America, or may be other processor types that would be recognized by one of ordinary skilled in the art. Alternatively, the CPU 601, 603 may be implemented on an FPGA, ASIC, PLD or using discrete logic circuits, as one of ordinary skilled in the art would recognize. Further, CPU 601, 603 may be implemented as multiple processors cooperatively working in parallel to perform the instructions of the inventive processes described above.

The computing device in FIG. 6 also includes a network controller 606, such as an Intel Ethernet PRO network interface card from Intel Corporation of America, for interfacing with network 660. As can be appreciated, the network 660 can be a public network, such as the Internet, or a private network such as a LAN or WAN network, or any combination thereof and can also include PSTN or ISDN subnetworks. The network 660 can also be wired, such as an Ethernet network, or can be wireless such as a cellular network including EDGE, 3G and 4G wireless cellular systems. The wireless network can also be Wi-Fi, Bluetooth, or any other wireless form of communication that is known.

The computing device further includes a display controller 608, such as a NVIDIA GeForce GTX or Quadro graphics adaptor from NVIDIA Corporation of America for interfacing with display 610, such as a Hewlett Packard HPL2445w LCD monitor. A general purpose I/O interface 612 interfaces with a keyboard and/or mouse 614 as well as a touch screen panel 616 on or separate from display 610. General purpose I/O interface also connects to a variety of peripherals 618 including printers and scanners, such as an OfficeJet or DeskJet from Hewlett Packard.

A sound controller 620 is also provided in the computing device such as Sound Blaster X-Fi Titanium from Creative, to interface with speakers/microphone 622 thereby providing sounds and/or music.

The general purpose storage controller 624 connects the storage medium disk 604 with communication bus 626, which may be an ISA, EISA, VESA, PCI, or similar, for interconnecting all of the components of the computing device. A description of the general features and functionality of the display 610, keyboard and/or mouse 614, as well as the display controller 608, storage controller 624, network controller 606, sound controller 620, and general purpose I/O interface 612 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown in FIG. 7.

Figure 7:
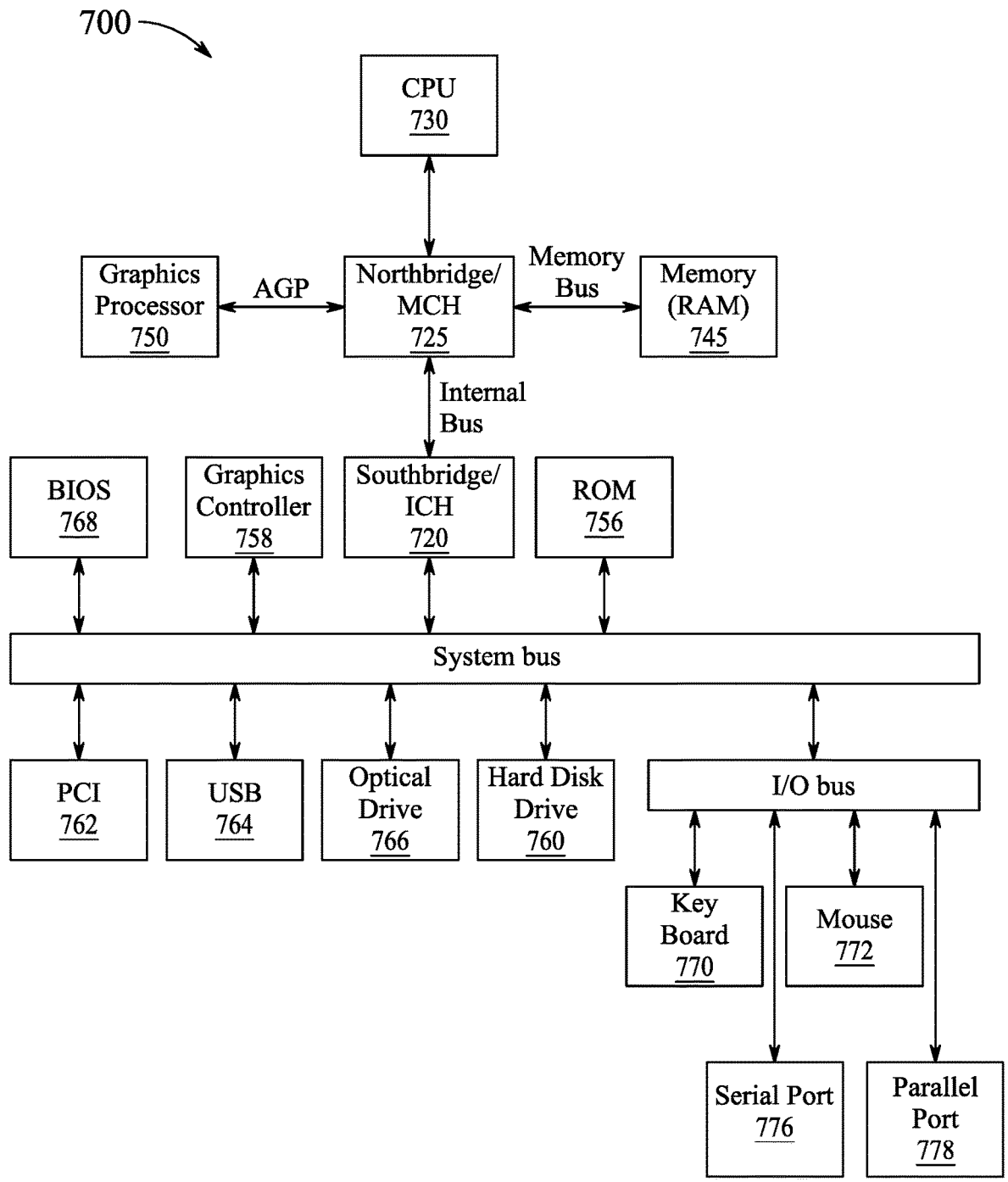
FIG. 7 is an exemplary schematic diagram of a data processing system used within the computing system, according to certain embodiments.
Figure 8:
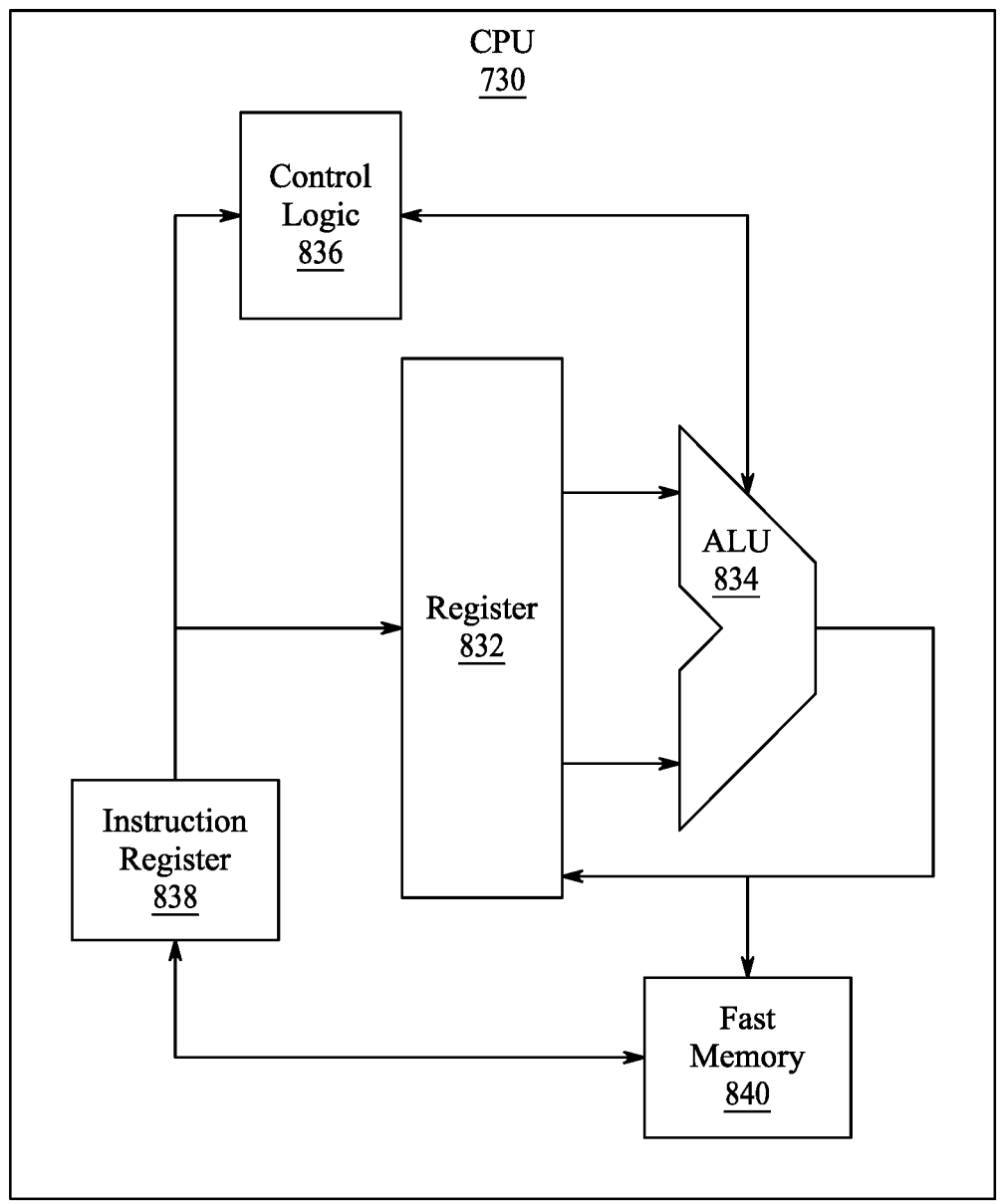
FIG. 8 is an exemplary schematic diagram of a processor used with the computing system, according to certain embodiments.

FIG. 7 shows a schematic diagram of a data processing system 700 used within the computing system, according to exemplary aspects of the present disclosure. The data processing system 700 is an example of a computer in which code or instructions implementing the processes of the illustrative aspects of the present disclosure may be located.

In FIG. 7, data processing system 700 employs a hub architecture including a north bridge and memory controller hub (NB/MCH) 725 and a south bridge and input/output (I/O) controller hub (SB/ICH) 720. The central processing unit (CPU) 730 is connected to NB/MCH 725. The NB/MCH 725 also connects to the memory 745 via a memory bus, and connects to the graphics processor 750 via an accelerated graphics port (AGP). The NB/MCH 725 also connects to the SB/ICH 720 via an internal bus (e.g., a unified media interface or a direct media interface). The CPU Processing unit 730 may contain one or more processors and even may be implemented using one or more heterogeneous processor systems.

For example, FIG. 7 shows one aspects of the present disclosure of CPU 730. In one aspects of the present disclosure, the instruction register 838 retrieves instructions from the fast memory 840. At least part of these instructions is fetched from the instruction register 838 by the control logic 836 and interpreted according to the instruction set architecture of the CPU 730. Part of the instructions can also be directed to the register 832. In one aspects of the present disclosure the instructions are decoded according to a hardwired method, and in other aspects of the present disclosure the instructions are decoded according to a microprogram that translates instructions into sets of CPU configuration signals that are applied sequentially over multiple clock pulses. After fetching and decoding the instructions, the instructions are executed using the arithmetic logic unit (ALU) 834 that loads values from the register 832 and performs logical and mathematical operations on the loaded values according to the instructions. The results from these operations can be feedback into the register and/or stored in the fast memory 840. According to certain aspects of the present disclosures, the instruction set architecture of the CPU 730 can use a reduced instruction set architecture, a complex instruction set architecture, a vector processor architecture, a very large instruction word architecture. Furthermore, the CPU 730 can be based on the Von Neuman model or the Harvard model. The CPU 730 can be a digital signal processor, an FPGA, an ASIC, a PLA, a PLD, or a CPLD. Further, the CPU 730 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 7, the data processing system 700 can include that the SB/ICH 720 is coupled through a system bus to an I/O Bus, a read only memory (ROM) 756, universal serial bus (USB) port 764, a flash binary input/output system (BIOS) 768, and a graphics controller 758. PCI/PCIe devices can also be coupled to SB/ICH 720 through a PCI bus 762.

The PCI devices may include, for example, Ethernet adapters, add-in cards, and PC cards for notebook computers. The Hard disk drive 760 and CD-ROM 756 can use, for example, an integrated drive electronics (IDE) or serial advanced technology attachment (SATA) interface. In one aspects of the present disclosure the I/O bus can include a super I/O (SIO) device.

Further, the hard disk drive (HDD) 760 and optical drive 766 can also be coupled to the SB/ICH 720 through a system bus. In one aspects of the present disclosure, a keyboard 770, a mouse 772, a parallel port 778, and a serial port 776 can be connected to the system bus through the I/O bus. Other peripherals and devices that can be connected to the SB/ICH 820 using a mass storage controller such as SATA or PATA, an Ethernet port, an ISA bus, an LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

Figure 9:
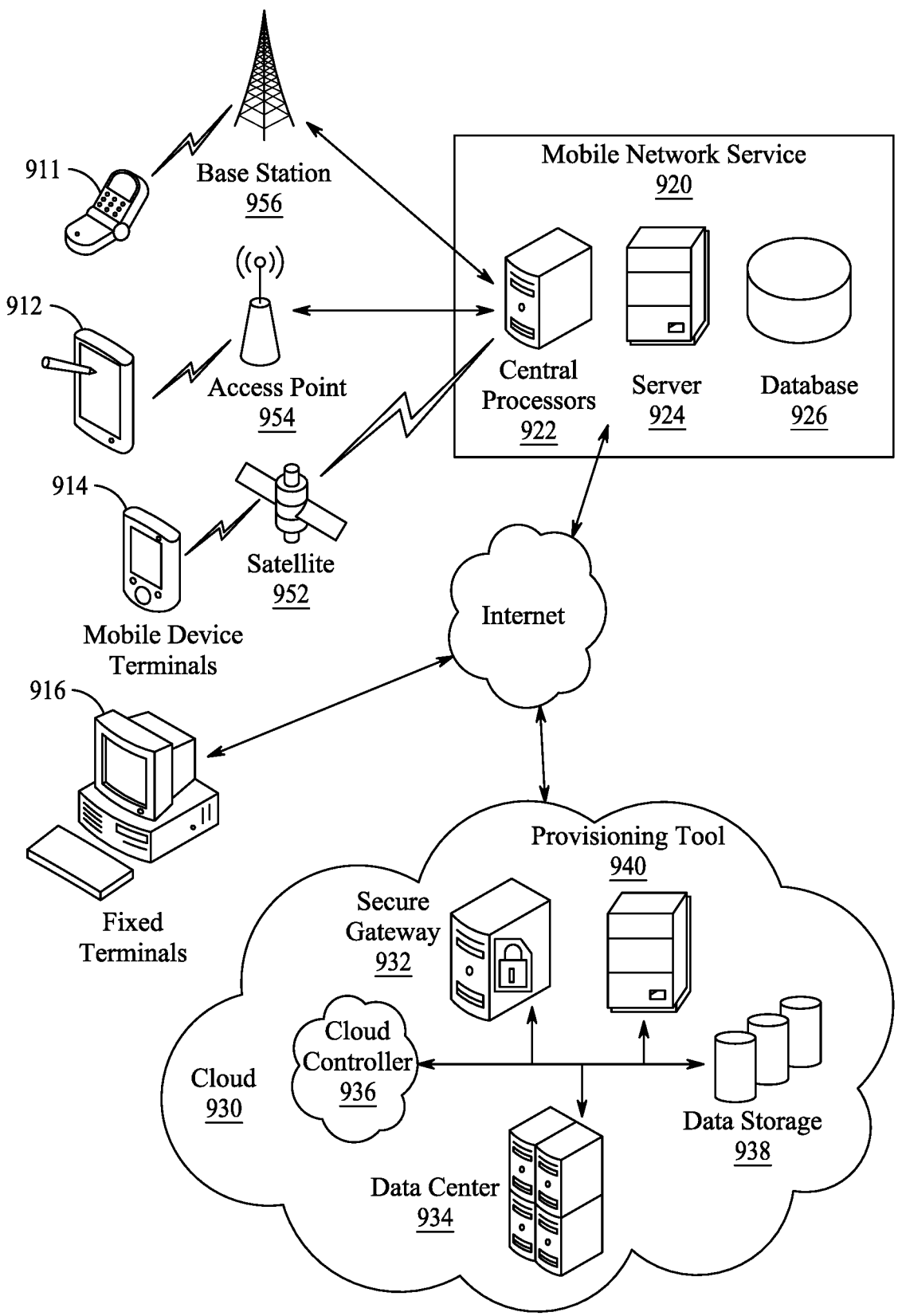
FIG. 9 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 9, in addition to various human interface and communication devices (e.g., display monitors, smart phones, tablets, personal digital assistants (PDAs)). More specifically, FIG. 9 illustrates client devices including smart phone 911, tablet 912, mobile device terminal 914 and fixed terminals 916. These client devices may be commutatively coupled with a mobile network service 920 via base station 956, access point 954, satellite 952 or via an internet connection. Mobile network service 920 may comprise central processors 922, server 924 and database 926. Fixed terminals 916 and mobile network service 920 may be commutatively coupled via an internet connection to functions in cloud 930 that may comprise security gateway 932, data center 934, cloud controller 936, data storage 938 and provisioning tool 940. The network may be a private network, such as a LAN or WAN, or may be a public network, such as the Internet. Input to the system may be received via direct user input and received remotely either in real-time or as a batch process. Additionally, some aspects of the present disclosures may be performed on modules or hardware not identical to those described. Accordingly, other aspects of the present disclosures are within the scope that may be claimed.

The above-described hardware description is a non-limiting example of corresponding structure for performing the functionality described herein.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A smart driver safety system for a vehicle, comprising:
a plurality of ultrasonic sensors configured to generate ultrasonic measurements of a head and an upper body of a driver of the vehicle;
a first infrared camera configured to measure a plurality of features on the driver's face;
a drowsy driver detector connected to the plurality of ultrasonic sensors and the first infrared camera, the drowsy driver detector including an electrical circuitry, a memory configured to store program instructions and a microprocessor configured to execute the program instructions to:
determine a head position of a driver;
determine when the upper body is in a slouched position;
detect an eye position of the driver's eyes;
determine when the eyes of the driver are closed;
when the driver's eyes are closed, determine a time duration of an eye closure;
compare the time duration to a drowsiness threshold;
when the eye closure exceeds the drowsiness threshold, generate a drowsiness alert signal;
an attention diversion monitor connected to the drowsy driver detector, wherein the attention diversion monitor is configured to detect deviations of the eyes of the driver from a straight ahead position and provide an attention diversion alert signal;
a plurality of actuators connected to the drowsy driver detector, wherein the plurality of actuators are configured to provide at least one of the drowsiness alert and the attention diversion alert;
an automatic mirror adjustment subsystem connected to the drowsy driver detector, wherein the automatic mirror adjustment subsystem is configured to determine, from the head position and the eye position, when the driver cannot see at least one side mirror of the vehicle and adjust the least one side mirror to a position in which the driver can see the at least one side mirror; and
a seat pressure sensor configured to detect a weight of a seat occupant of a driver's seat of the vehicle;
wherein the microprocessor is configured to:
receive the weight;
compare the weight to a weight threshold;
when the weight is less than the weight threshold, determine that the seat occupant is not the driver; and
when the weight is equal to or greater than the weight threshold, determine that the seat occupant is the driver and activate the drowsy driver detector.

2. The smart driver safety system of claim 1, wherein the weight threshold is about 50 kg.

3. The smart driver safety system of claim 1, further comprising:
a registration database connected to the microprocessor, wherein the registration database includes the weight of the driver of the vehicle and the weight threshold is about the weight of the driver.

4. The smart driver safety system of claim 1, further comprising:
at least three ultrasonic sensors connected to the drowsy driver detector;
a second infrared camera communicably connected to the drowsy driver detector, wherein the second infrared camera is configured to record eye movements of the eyes of the driver;
a digital image processor connected to the drowsy driver detector, wherein the digital image processor is configured to receive the ultrasonic measurements and the recorded eye movements, map both the head position and the recorded eye movements to an image matrix and generate a time series of mapped eye movements;
wherein the microprocessor is configured to:
receive the time series of mapped eye movements,
determine a gaze direction of the eyes of the driver based on the time series of mapped eye movements,
determine whether the driver can see the side mirrors based on the gaze direction,
when the driver cannot see the side mirrors, generate drive signals configured to adjust at least one of the side mirrors; and
the automatic mirror adjustment subsystem is connected to the microprocessor and is configured to receive the drive signals from the microprocessor and adjust the at least one side mirror based on the drive signals.

5. The smart driver safety system of claim 4, wherein the attention diversion monitor is further configured to:
receive the time series of mapped eye movements;
compare the eye position at each time of the time series to the eye position of at least one previous time;
monitor deviations in the eye position from straight ahead;
detect a time period of the deviations;
compare the time period of the deviations to an eye deviation threshold; and
provide the attention diversion alert when the time period of the deviations is greater than the eye deviation threshold.

6. The smart driver safety system of claim 5, wherein the plurality of actuators includes a buzzer configured to receive the attention diversion alert and generate the audible buzzer sound.

7. The smart driver safety system of claim 5, further comprising:
at least a buzzer and a speaker included in the plurality of actuators;
a suggestion database connected to the drowsy driver detector, wherein the suggestion database includes recommendations for mitigating drowsiness, wherein the recommendations are based on a length of the time duration greater than the drowsiness threshold; and
wherein the microprocessor is configured to determine the length of each time duration greater than the drowsiness threshold, match the time duration to a recommendation in the database, and generate drive signals to provide the recommendation to the driver through one of the speaker and the buzzer.

8. The smart driver safety system of claim 7, further comprising:
a communication device connected to the microprocessor;
a global positioning receiver connected to the communication device, wherein the global positioning receiver is configured to provide geolocation coordinates of the vehicle to the microprocessor; and
a mapping application stored in the memory, wherein the mapping application is configured to show a street map on a route being travelled by the vehicle, wherein the street map includes a location of at least one of a retail location and a rest stop along the route, wherein the mapping application further includes the geolocation coordinates of the vehicle;
the microprocessor is further configured to add recommendations to the suggestion database, wherein the recommendations at least one of a recommendation to stop at the at least one of a retail location and recommendation to stop at a rest stop along the route; and the microprocessor is configured to generate the drive signals to actuate the speaker to provide the recommendation to the driver.

9. The smart driver safety system of claim 8, wherein:

the mapping application is configured to show any road hazards on the route;

the mapping application is further configured to show alternate routes including any road hazards on the alternate routes;

the microprocessor is further configured to determine a safest route and add a recommendation to the suggestion database that the driver should drive on the safest route; and the microprocessor is configured to generate the drive signals to actuate the speaker to provide the recommendation to the driver when the time duration is greater than the drowsiness threshold.

10. The smart driver safety system of claim 7, further comprising:

a radio connected to the microprocessor, wherein the radio is configured with a plurality of music playing channels, wherein the radio is configured to play music of one of the music playing channels through the speaker;

the microprocessor is further configured to search the music playing channels and identify a music playing channel with a drowsiness mitigating music; and the microprocessor is further configured to increase a volume of the radio and play the drowsiness mitigating music when the time duration is greater than the drowsiness threshold.

11. The smart driver safety system of claim 7, wherein:

the plurality of actuators includes a theft alarm;

the drowsy driver detector is configured to determine a response of the driver to the recommendation by one or more of a change in the head position and a change in the eye position; and the microprocessor is configured to actuate the theft alarm when the driver does not respond to the recommendation.

12. The smart driver safety system of claim 7, further comprising:

a microphone connected to the microprocessor, wherein the microprocessor is configured to receive a driver recommendation for mitigating drowsiness through the microphone and add the driver recommendation to the suggestion database.

13. A smart driver safety system for a vehicle, comprising:

a plurality of ultrasonic sensors configured to generate ultrasonic measurements of a head and an upper body of a driver of the vehicle;

a first infrared camera configured to measure a plurality of features on the driver's face;

a drowsy driver detector connected to the plurality of ultrasonic sensors and the first infrared camera, the drowsy driver detector including an electrical circuitry, a memory configured to store program instructions and a microprocessor configured to execute the program instructions to:

determine a head position of a driver;

determine when the upper body is in a slouched position;

detect an eye position of the driver's eyes;

determine when the eyes of the driver are closed:

when the driver's eyes are closed, determine a time duration of an eye closure;

compare the time duration to a drowsiness threshold;

when the eye closure exceeds the drowsiness threshold, generate a drowsiness alert signal:

an attention diversion monitor connected to the drowsy driver detector, wherein the attention diversion monitor is configured to detect deviations of the eyes of the driver from a straight ahead position and provide an attention diversion alert signal;

a plurality of actuators connected to the drowsy driver detector, wherein the plurality of actuators are configured to provide at least one of the drowsiness alert and the attention diversion alert;

an automatic mirror adjustment subsystem connected to the drowsy driver detector, wherein the automatic mirror adjustment subsystem is configured to determine, from the head position and the eye position, when the driver cannot see at least one side mirror of the vehicle and adjust the least one side mirror to a position in which the driver can see the at least one side mirror; and a seat pressure sensor configured to detect a weight of a seat occupant of a driver's seat of the vehicle;

wherein the microprocessor is configured to:

receive the weight;

compare the weight to a weight threshold;

when the weight is less than the weight threshold, determine that the seat occupant is not the driver; and when the weight is equal to or greater than the weight threshold, determine that the seat occupant is the driver and activate the drowsy driver detector;

wherein the seat pressure sensor comprises at least two strain gauge load cells located beneath the driver's seat, wherein the at least two strain gauge load cells generate strain gauge signals, and wherein the seat pressure sensor is configured to determine the weight based on the strain gauge signals.

* * * * *